United States Patent
Whelan

(10) Patent No.: US 10,227,922 B2
(45) Date of Patent: Mar. 12, 2019

(54) LOW NO$_x$ TURBINE EXHAUST FUEL BURNER ASSEMBLY

(71) Applicant: John Zink Company, LLC, Tulsa, OK (US)

(72) Inventor: Matt Whelan, Foster City, CA (US)

(73) Assignee: JOHN ZINK COMPANY, LLC, Tulsa, OK (US)

(*) Notice: Subject to any disclaimer, the term of this patent is extended or adjusted under 35 U.S.C. 154(b) by 557 days.

(21) Appl. No.: 14/836,559

(22) Filed: Aug. 26, 2015

(65) Prior Publication Data

US 2016/0061110 A1    Mar. 3, 2016

Related U.S. Application Data

(60) Provisional application No. 62/042,738, filed on Aug. 27, 2014.

(51) Int. Cl.
*F02C 3/34* (2006.01)
*F02C 7/228* (2006.01)
(Continued)

(52) U.S. Cl.
CPC .............. *F02C 3/34* (2013.01); *F02C 7/042* (2013.01); *F02C 7/057* (2013.01); *F02C 7/22* (2013.01);
(Continued)

(58) Field of Classification Search
CPC .. F02C 3/34; F02C 7/042; F02C 7/057; F02C 7/22; F02C 7/228; F23C 9/00;
(Continued)

(56) References Cited

U.S. PATENT DOCUMENTS 3,958,922 A    5/1976   Goodnight
4,708,638 A    11/1987  Brazier
(Continued)

FOREIGN PATENT DOCUMENTS

DE    9103456 U1    6/1991

OTHER PUBLICATIONS

English translation of specification and claims of Vaillant DE9103456U1.*

(Continued)

*Primary Examiner* — Ehud Gartenberg
*Assistant Examiner* — Scott Walthour

(57) ABSTRACT

A low NO$_X$ burner in which the amount of air flow to the low NO$_X$ (nitrous oxides) burner can be adjusted (e.g., based on determinations related to the TEG air flow to the low NO$_X$ burner). A low NO$_X$ burner capable of operating in a TEG mode that uses a mixture of fresh air and turbine exhaust gas (TEG) as an oxidizer, and also in a fresh air mode in which fresh air (but not TEG) is used as an oxidizer (e.g., and that may be configured to switch seamlessly between these modes). A method of operating a low NOx burner that that includes using TEG and fresh air as an oxidizer to burn fuel, in a TEG mode and, when conditions dictate, such as when the TEG flow has decreased to a pre-determined level (e.g., zero or close to zero), switching from the TEG mode to a fresh air mode.

25 Claims, 10 Drawing Sheets

(51) Int. Cl.
  *F02C 7/22* (2006.01)
  *F02C 7/057* (2006.01)
  *F02C 7/042* (2006.01)
  *F23R 3/34* (2006.01)
  *F23D 14/64* (2006.01)
  *F23D 14/70* (2006.01)
  *F23D 14/62* (2006.01)
  *F23C 9/00* (2006.01)
  *F23D 14/22* (2006.01)
  *F23R 3/04* (2006.01)
  *F23R 3/26* (2006.01)
  *F23R 3/28* (2006.01)

(52) U.S. Cl.
  CPC .............. *F02C 7/228* (2013.01); *F23C 9/00* (2013.01); *F23D 14/22* (2013.01); *F23D 14/62* (2013.01); *F23D 14/64* (2013.01); *F23D 14/70* (2013.01); *F23R 3/04* (2013.01); *F23R 3/26* (2013.01); *F23R 3/286* (2013.01); *F23R 3/34* (2013.01); *F23C 2202/10* (2013.01); *F23C 2202/20* (2013.01); *F23C 2202/30* (2013.01); *F23C 2202/50* (2013.01); *Y02E 20/16* (2013.01)

(58) Field of Classification Search
  CPC ......... F23C 2202/10–2202/30; F23C 2202/50; F23D 14/22; F23D 14/62; F23D 14/64; F23D 14/70; F23R 3/04; F23R 3/26; F23R 3/286; F23R 3/34
  See application file for complete search history.

(56) References Cited

U.S. PATENT DOCUMENTS

| | | | | |
|---|---|---|---|---|
| 5,275,554 A | * | 1/1994 | Faulkner | .................. F23C 1/08 |
| | | | | 431/115 |
| 5,284,438 A | * | 2/1994 | McGill | .................. F23C 9/006 |
| | | | | 431/116 |
| 6,524,098 B1 | | 2/2003 | Tsirulnikov | |

OTHER PUBLICATIONS

International Search Report dated Nov. 3, 2015 for PCT Application No. PCT/US2015/046983.

\* cited by examiner

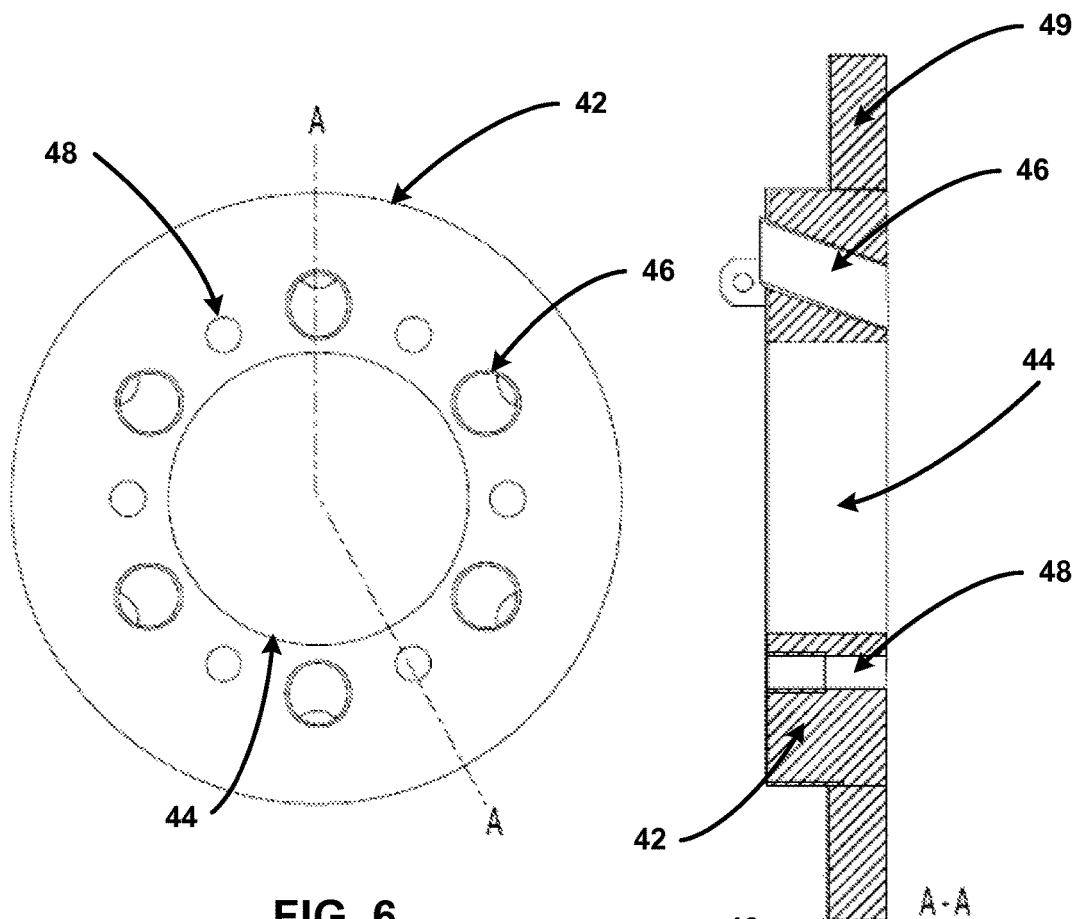
FIG. 6
FIG. 7
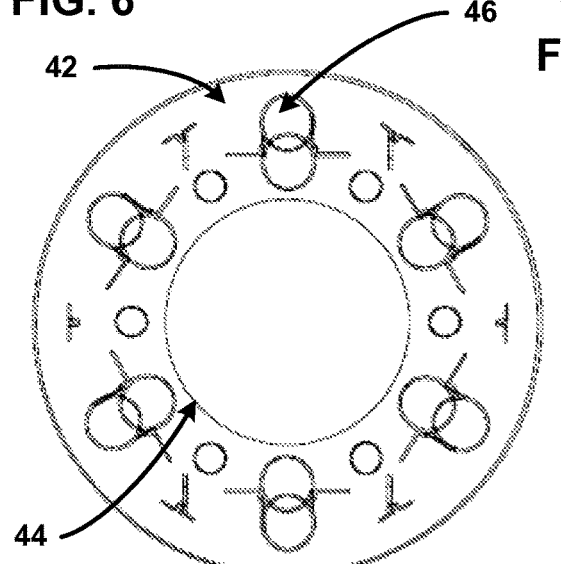
FIG. 8

LOW NO$_x$ TURBINE EXHAUST FUEL BURNER ASSEMBLY

CROSS-REFERENCE TO RELATED APPLICATIONS

The present application claims priority to U.S. Provisional Patent Application No. 62/042,738, entitled "LOW NO$_X$ TURBINE EXHAUST FUEL BURNER ASSEMBLY," filed Aug. 27, 2014, the disclosure of which is incorporated herein by reference in its entirety.

FIELD

The present invention is related generally to a low NOx burner assembly and more particularly, but not by way of limitation, to a low NOx burner that can operate utilizing either fresh air or a variable mixture of turbine exhaust gas (TEG) and fresh air.

BACKGROUND

Very large burner assemblies are used in a variety of applications. Such applications include, but are not limited to, heating air for air heaters and dryers, heating water to generate steam in boilers, or as part of combined cycle systems. Combined cycle systems typically generate both electricity and steam. In such combined cycle systems, a gas turbine typically generates the electrical power by burning a gaseous hydrocarbon fuel with air.

The present disclosure relates to particular burners, namely Low NO$_X$ burners; and the general term, "NO$_X$" (nitrogen oxides) is used to describe a group of molecules that contain varying amounts of nitrogen and oxygen at certain ratios. NO$_X$ generally forms at high temperatures during fossil fuel combustion of some sort. In the United States, the primary sources of NO$_x$ Emissions are motor vehicles, power plants, and other commercial, industrial, and residential sources that combust fossil fuels. Direct NO$_X$ emissions from these sources include several different forms, such as nitrogen dioxide (NO$_2$), nitrous oxide (N$_2$O), and nitric oxide (NO), however, NO$_X$ generated during combustion is primarily produced in the form of NO. NO$_X$ emissions react with other compounds, such as those compounds considered or classified as volatile organic compounds in the troposphere to form secondary products that include ozone (O$_3$), nitric acid (HNO$_3$), nitrate particles, and the like. NO$_X$ emissions are generally considered to be air pollutants by themselves, as well as precursors to the formation of ozone (i.e., smog) and acid rain.

To protect public health, concentrations of NO$_X$ and ozone in the ambient atmosphere are often subject to air quality standards established in the United States by the Environmental Protection Agency (EPA). Because of the potentially negative health and environmental impacts associated with NO$_X$ emissions and their role in generating tropospheric ozone, NO$_X$ emissions producers are often highly regulated by the EPA, as well as by state and local environmental authorities. Regulations by federal and state authorities have engendered the development of low NO$_X$ burners for industrial applications. One example of a low NO$_X$ burner is described in U.S. Pat. No. 5,460,512. One version of this burner, commercially referred to as a QLN™ burner, is available from John Zink Company, LLC (www.johnzink-.com) and provides for reduced NO$_X$ emissions.

One way to reduce NO$_X$ emissions in known burner systems is by introducing inert gases (e.g. CO$_2$, H$_2$O) into a combustion reaction to reduce peak flame temperature. Most commonly, this type of reduction is accomplished by recirculating direct products of combustion, such as flue exhaust gases, back into a combustion process, and is commonly referred to as Flue Gas Recirculation (FGR). Alternatively, exhaust gases from gas turbines may be used for combustion.

As noted above, in combined cycle systems, gas turbines burn hydrocarbon gases to generate electricity. Due to certain design constraints and operating requirements of gas turbines, the combustion process usually only partially depletes the available oxygen in air. Consequently, the resulting Turbine Exhaust Gas (TEG) often contains an elevated concentration of oxygen compared to typical exhaust gas found in boilers. This relatively large quantity of oxygen in TEG can be used as an oxidizer source for subsequent downstream fuel combustion.

Such downstream fuel combustion typically involves placing burners across a cross-section of a TEG exhaust duct. These burners, commonly referred to as duct burners, further deplete the TEG oxygen and generate sensible heat or thermal energy, which elevates the exhaust gas temperature. A Heat Recovery Steam Generator (HRSG) recovers the residual heat (present when exiting the turbine) of the TEG and the sensible heat added by the duct burner and uses these sources of heat to produce steam. Alternatively, and less commonly, the TEG can be ducted to a standard burner and boiler.

SUMMARY

Important design criteria of a boiler are that the burner flame profile fit the furnace such that the flame does not impinge on a surface and that the fuel is sufficiently oxidized, thus preventing high levels of unburned fuel and/or preventing high levels of NO$_X$ in the exhaust. The flame profile is determined, at least in part, by the fuel heat input and the exit velocity of the TEG. Relative to the fresh air often used in air-oxidized Low NO$_X$ burners, the TEG used in TEG-oxidized Low NO$_X$ burners has a depleted oxygen concentration and an elevated temperature. Thus, achieving equivalent amounts of oxygen in a TEG-oxidized burner typically requires the volumetric flow of TEG to be about double the volumetric flow of fresh air in an air-oxidized burner. Due to these differences, when all other variables are constant, the exit velocity and pressure of the TEG-burner is typically much higher using TEG as an oxidizer rather than fresh air.

In combined cycle systems, the source of oxygen for the downstream duct burners is typically TEG. The volume and composition (in particular oxygen concentration) of the TEG flow depends on the size of the gas turbine and the often variable electrical load demand of that gas turbine. As a result, the volume and composition of TEG flow in combined systems is often variable. To counter this variability in composition and volume of TEG flow, these systems may operate with much higher stack exhaust excess oxygen relative to a standard boiler.

Embodiments of the present systems and methods are configured to counteract the variability in the flow rate and oxygen composition of TEG supplied as an oxidizer to a low NO$_X$ burner while still being able to operate the low NO$_X$ burner with low exhaust excess oxygen. In some of the present embodiments, variable auxiliary fresh air is added to the low NO$_X$ burner based on the flow and composition of TEG to the low NO$_X$ burner. In some of the present embodiments, when the rate of TEG flow reduces to zero or to a pre-determined level close to zero, the low NO$_X$ burner is configured to switch to a mode in which only fresh air is used as an oxidizer. Thus, embodiments of the present burners are configured to utilize, as an oxidizer, either a mixture of fresh air and TEG or fresh air without TEG.

Some embodiments of the present burner assemblies (e.g., low-NO$_X$ turbine exhaust fuel burner assemblies) are configured to operate with an oxidizer of either fresh air or a combination of turbine exhaust gas (TEG) and fresh air, and comprise: a windbox comprising a sidewall defining a chamber and a fresh air inlet through the sidewall of the windbox in fluid communication with the chamber; a TEG plenum coupled to the windbox, the TEG plenum comprising a sidewall defining a chamber and a TEG inlet through the sidewall of the TEG plenum in fluid communication with the chamber; a burner barrel coupled to the windbox and the TEG plenum, the burner barrel having a sidewall defining a plurality of openings and a channel extending between a first end and a second end, the channel in fluid communication with the chamber of the windbox separately from the plurality of openings, the plurality of openings configured to permit TEG to flow from the TEG plenum into the channel of the burner barrel; one or more fuel injectors coupled to the burner barrel and configured to inject fuel for combustion; and one or more dampers coupled to the burner barrel and configured to be moved between at least: (i) a first configuration in which the one or more dampers cover the plurality of openings to substantially prevent TEG from entering the burner barrel through the plurality of openings; and (ii) a second configuration in which the one or more dampers do not cover at least a portion of the plurality of openings to permit TEG to enter the burner barrel through the plurality of openings.

Some embodiments of the present burner assemblies further comprise: an air mover adapted to flow fresh air through the fresh air inlet. In some embodiments, the air mover comprises a fan, a compressor, or a fan and a compressor.

In some embodiments of the present burner assemblies, the TEG plenum is disposed within the windbox. Some embodiments further comprise: a duct coupled to the TEG plenum in fluid communication with the TEG inlet. In some embodiments, the burner barrel is at least partially disposed within the chamber of the TEG plenum.

In some embodiments of the present burner assemblies, the one or more dampers comprise a slide damper disposed around the burner barrel such that the slide damper is slidable between the first configuration and the second configuration.

Some embodiments of the present burner assemblies further comprise: a burner plate coupled to the second end of the burner barrel; and a center fire gas (CFG) gun fuel spud that extends in a downstream direction, which extends from the first end of the burner barrel toward the second end, through the burner barrel and burner plate into a first fuel zone. Some embodiments further comprise: a plurality of core fuel spuds extending from in the downstream direction and to a second fuel zone; a plurality of inner fuel spuds extending in the downstream direction and to a third fuel zone; and a plurality of outer fuel spuds extending in the downstream direction to a fourth fuel zone. Some embodiments further comprise: a port ring having an annular body coupled to the TEG plenum and encircling the second end of the burner barrel, the body defining a plurality of ports configured to permit TEG to flow from the turbine exhaust gas plenum to a boiler. In some embodiments, outlets of the ports are angled inward relative to a longitudinal axis of the burner barrel.

Some embodiments of the present apparatuses (e.g., for use in low-NO$_X$ turbine exhaust fuel burner assemblies) comprise: a burner barrel having a sidewall defining a plurality of openings and a channel extending between a first end and a second end, the burner barrel configured to be coupled to a windbox of the burner assembly and a TEG plenum of the burner assembly such that: (i) the channel of the burner barrel is in fluid communication with the chamber of the windbox separately from the plurality of openings, and (ii) the plurality of openings is configured to permit TEG to flow from the TEG plenum into the channel of the burner barrel. Some embodiments further comprise: one or more dampers coupled to the burner barrel and configured to be moved between at least: (i) a first configuration in which the one or more dampers cover the plurality of openings to substantially prevent TEG from entering the burner barrel through the plurality of openings; and (ii) a second configuration in which the one or more dampers do not cover at least a portion of the plurality of openings to permit TEG to enter the burner barrel through the plurality of openings. In some embodiments, the one or more dampers comprise a slide damper disposed around the burner barrel such that the slide damper is slidable between the first configuration and the second configuration.

Some embodiments of the present methods (e.g., of operating a low-NO$_X$ turbine exhaust fuel burner) comprise: in a turbine exhaust gas (TEG) mode in which TEG and fresh air are flowing to a burner barrel of the burner to burn fuel, regulating the flow of the fresh air based on one or more characteristics of the flowing TEG; switching from the TEG mode to a fresh air mode, in which fresh air but not TEG is flowing to the burner barrel of the burner to burn the fuel, by stopping the flow of TEG to the burner barrel while continuing the flow of fresh air to the burner barrel to burn the fuel; and resuming the TEG mode by resuming the flow of TEG to the burner barrel in combination with the flow of fresh air to the burner barrel to burn the fuel.

In some embodiments of the present methods, in the TEG mode, the TEG flows through a duct to a TEG plenum, from the TEG plenum to the burner barrel, at least a portion of the burner barrel being disposed within the turbine exhaust plenum; fresh air flows from an air mover into the burner barrel; and the one or more characteristics of the flowing TEG comprise one or more characteristics selected from the list consisting of: a concentration of oxygen in the TEG, an amount of flow of the TEG, temperature of the flowing TEG, rate of flow of fuel to a turbine supplying the TEG, temperature of the fuel flowing to the turbine, rate of flow of air to the turbine, temperature of the air flowing to the turbine. Some embodiments further comprise: in the TEG mode, regulating the rate of flow of the TEG to the TEG plenum by adjusting position of a damper relative to the burner barrel to cover or at least partially uncover openings defined by a sidewall of the burner barrel in communication with a channel of the burner barrel. In some embodiments, switching from the TEG mode to the fresh air mode comprises adjusting the damper to cover the openings. In some embodiments, the switching is completed in response to a turbine supplying the TEG ceasing to operate. Some embodiments further comprise: flowing the fresh air to a windbox encompassing the turbine exhaust gas plenum, where the flowing of the fresh air cools the turbine exhaust gas plenum.

Some embodiments of the present methods (e.g., of operating a low-$NO_X$ turbine exhaust fuel burner) comprise: in response to detection of a gas turbine trip while operating the burner in a turbine exhaust gas (TEG) mode in which TEG and fresh air are flowing to a burner barrel of the burner to burn fuel; switching operation of the burner from the TEG mode to a fresh air mode in which fresh air but not TEG flows to the burner barrel of the burner to burn the fuel. In some embodiments, switching from the TEG mode to the fresh air mode comprises increasing the flow of fresh air to the burner barrel.

In some embodiments of the present methods, switching operation of the burner assembly from the TEG mode to the fresh air only mode is performed according to a sequence of operations configured to achieve a pre-determined amount of thermal energy to be generated by the burner assembly. In some embodiments, the sequence of operation includes: reducing the rate of burning the fuel to a TEG low fire state; moving fuel flow control valves to a fresh air light-off position; closing a damper of the burner to prevent TEG from flowing into the burner barrel; and adjusting an air mover to supply fresh air to the burner barrel at a fresh air light-off rate.

Some embodiments of the present methods (e.g., of operating a low-$NO_X$ turbine exhaust fuel burner) comprise: adjusting a combustion air source supplying air to the burner based on one or more characteristics of a source of turbine exhaust gas (TEG) for the burner. In some embodiments, the one or more characteristics comprise flow and temperature parameters of fuel and air flowing to a turbine that is a source of TEG for the burner. In some embodiments, adjusting the airflow set point includes: determining a TEG equivalent airflow (e.g., based on: a measured volumetric flow of combustion air supplying the gas turbine, corrected for ambient temperature and normalized to standard temperature and pressure; and a measured volumetric flow of fuel supplying the gas turbine, normalized to standard temperature and pressure); and subtracting the TEG equivalent airflow from a desired total airflow to determine an airflow set point for adjustment of the combustion air source. In some embodiments, the combustion air source comprises a fan, and where adjusting the combustion air source includes controlling a variable frequency drive (VFD) and a control damper of the fan to adjust for variations in TEG flow and TEG $O_2$ to maintain a low stack exhaust $O_2$ setpoint.

The foregoing has outlined rather broadly certain features and technical advantages of the present disclosure in order that the detailed description of the disclosure that follows may be better understood. Additional features and advantages of the disclosure are described below. It should be appreciated by those skilled in the art that the conception and specific embodiments disclosed may be readily utilized as a basis for modifying or designing other structures for carrying out the same purposes of the present disclosure, without departing from the spirit and scope of the disclosure as set forth in the claims. The features that are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of what is specified, where the percentage includes 0.1, 1, 5, and 10 percent.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (with the exception of flowcharts and block diagrams, or unless otherwise noted), meaning the sizes of the depicted elements are accurate relative to each other for at least the embodiment depicted in the figures.

FIG. 6 shows a front view of a port ring of some embodiments of the present burners, such as the burner of FIGS. 1 and 2.

FIG. 7 shows a cross-sectional side view of the port ring of FIG. 6.

FIG. 8 shows a front view with hidden lines of the port ring of FIG. 6.

DETAILED DESCRIPTION

Figure 1:
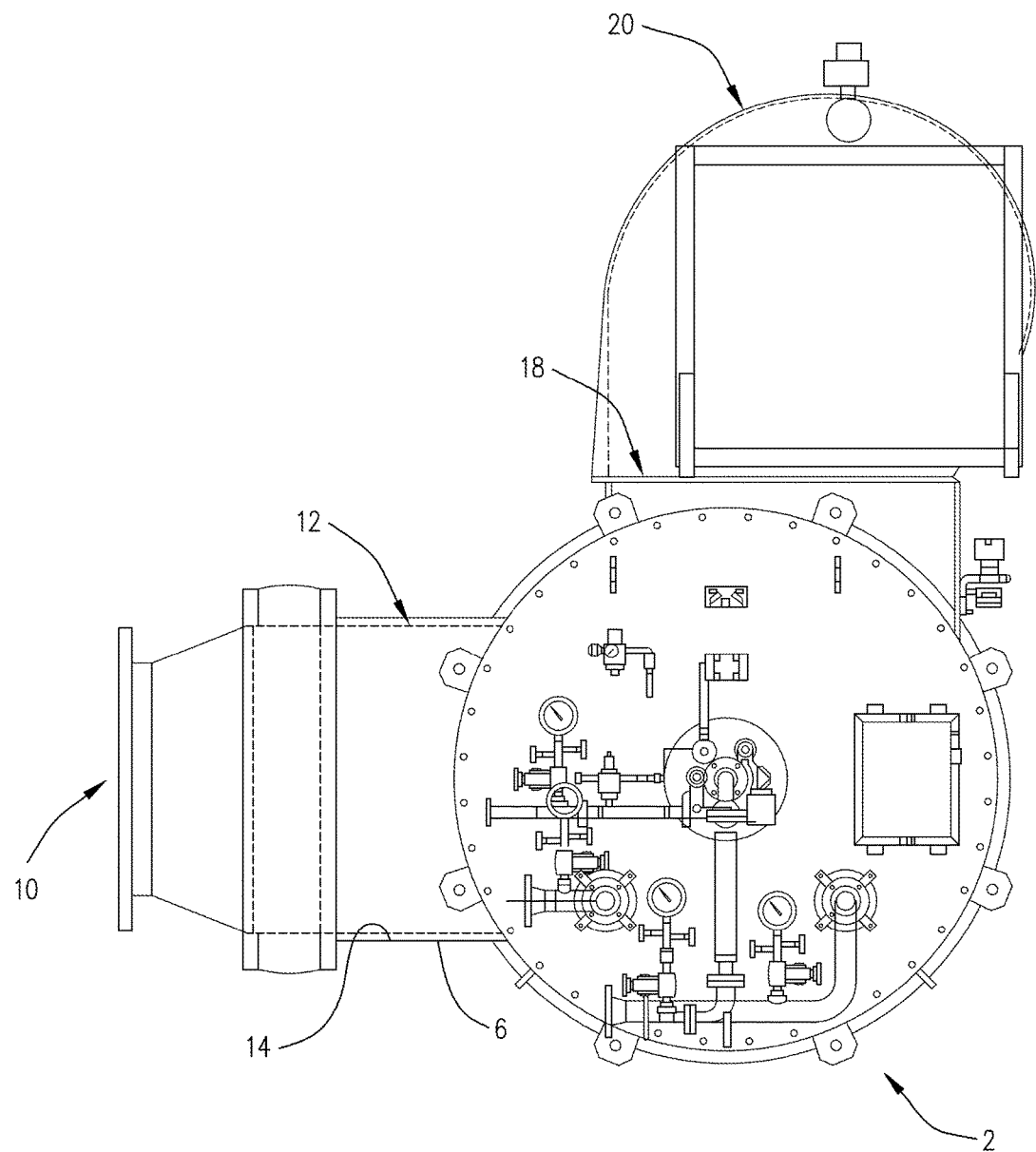
FIGS. 1 and 2 show front and side views, respectively, of an embodiment of the present burner assemblies.

In the present low $NO_X$ burners, the amount of airflow to the burner can be adjusted based on one or more characteristics of turbine exhaust gas (TEG) flow (e.g., a lack of TEG flow) to the burner. The present low-$NO_X$ burners are thus configured to operate with a variable mixture of TEG and fresh air while maintaining low exhaust excess air, such as, for example, in a fresh air mode with either fresh air (without TEG) as the oxidizer or a TEG mode with a mixture of fresh air and TEG as an oxidizer. Some embodiments are configured to switch between these modes seamlessly without interruption to the operation of the burner.

At least some of the present burner assemblies comprise a fresh air windbox and a TEG plenum coupled to a burner barrel (e.g., with the TEG plenum disposed in the windbox). Some of the present burners also comprise mechanisms for operating the burner in multiple modes, including the fresh air mode or the TEG mode. For such embodiments, in the TEG mode, fresh air is supplied to a windbox and is funneled into a burner barrel to mix with TEG, after which the mixture flows to a burn zone to burn fuel. The TEG is supplied to the TEG plenum from a gas turbine, and may be injected both through staged TEG ports and into the burner barrel via openings (e.g., slots) to mix with the fresh air. A damper, such as a slide damper, may be disposed in an "open" position or configuration to allow free flow of TEG into the burner barrel through the openings. For such embodiments, in the fresh air mode, fresh air is supplied to the windbox and is funneled into the burner barrel and from the barrel burner into a burn zone to burn fuel. In this fresh air mode, an upstream damper in the TEG supply line may be closed so that TEG flow is isolated from the TEG plenum, while a TEG vent damper is opened allowing the TEG to discharge to atmosphere. The damper may also be disposed in a "closed" position or configuration to prevent TEG from flowing into the burner barrel. In some of the present embodiments, these operational modes may allow for similar exit velocities for both modes despite much higher volumetric flow of TEG in the TEG mode. This similarity of exit velocities may be accomplished with a larger effective exit area (total cross-sectional area for flow) in the TEG mode. For example, in the TEG mode, both the burner barrel and a plurality of TEG staged ports may be used to pass flow; while, in the fresh air mode, only the burner barrel may be used to pass flowing air (not TEG). As described above, in the fresh air mode, the damper may isolate the TEG plenum from the burner barrel such that substantially all fresh airflow (e.g., less a small leakage flow, such as, for example, less than 10 percent of all fresh airflow entering the windbox) passes down the burner barrel. The TEG staged ports and the openings may be configured (e.g., via respective cross-sectional areas inversely proportional to their expected respective flow velocities).

Certain burner configurations are described in U.S. Pat. No. 5,460,512 ("the '512 patent"), referenced above, the entirety of which is incorporated herein by reference. This burner assembly reduces NOx emissions by rapid entrainment of gases from the furnace volume into the combustion region. Aspects disclosed in the '512 patent involve using the burner assembly as catalytic combustor in a cogeneration gas turbine system in which chemical energy is converted to mechanical, electrical, and/or thermal energy. Aspects disclosed in the '512 patent may also be suited for applications in chemical processes that involve the oxidation of organic waste at high temperatures and pressures.

The '512 patent discloses single-stage and two-stage burner configurations. The single stage burner configurations operate with a large amount of excess combustion air, i.e., more than stoichiometric, supplied through burner plate slots, to keep the flame relatively cool to minimize the generation of NOx. Although excess-air burners are useful for duct heaters, they may be relatively inefficient for heating furnaces, boilers, and/or the like. For these latter applications, the '512 patent discloses a two-stage burner assembly having a secondary fuel gas and flue gas injection assembly.

The single-stage burner configurations disclosed by the '512 patent reduce NOx formation by as much as 80%. These effects are achieved by an arrangement of burner tubes and slots that envelopes gas with air and create desirable turbulence to produce a cone shape of an expanding gas stream. Under these conditions, ignition starts from the periphery of the cone shaped jets discharging from the burner plate slots, where fuel gas concentration is close to the lean flammability limit, and propagates by turbulent mixing of the recombustion gases to the jet centers. Thus, local fuel-air ratios during combustion do not exceed the average, based on total fuel and air input to the burner, and NOx formation is thereby diminished. As a result of the burner tube and slot arrangement, the width of the recirculating air zones between slots varies significantly in the radial direction. Thus, the recirculating areas of hot combustion products in the wake of the plates between slots vary significantly in the radial direction, so that local ignition patterns also vary. As a result, local oscillations of flame fronts tend to occur at different frequencies and are not synchronized.

The two-stage burner configurations disclosed by the '512 patent also exhibit further reduction of NOx formation by as much as 95%. These effects are achieved by provision of a plurality of discrete secondary fuel gas injection tubes and forced recirculation flue gas injection tubes, both arranged around the primary air and fuel gas discharge assembly. Each injection tube has a discharge end portion that is radially spaced from the primary air and fuel gas discharge assembly. The secondary fuel gas injection tubes include an inlet portion adapted for coupling to a secondary fuel gas source, while the flue gas injection tubes include an inlet portion adapted for coupling to a flue gas recirculation line. During operation of the two-stage burner assembly, the flue gases generated in the combustion chamber flow to a flue gas stack where a portion of those gases are drawn into a recirculation line including a fan which feeds into the flue gas injection tubes. The secondary fuel gas, together with the recirculated flue gas, is then injected under pressure into the combustion flame at a particular region of the flame. Since the recirculated flue gases, as well as the secondary fuel gas, are discharged in a forced draft, the direction of the flue and fuel gas jets or streams discharged from the flue gas and secondary fuel gas tubes can be controlled to reach the combustion flame at the desired location. In this manner, two combustion zones can be generated in the combustion chamber such that NOx formation is minimized and a relatively high heat capacity maintained when low excess air burner input is required.

As may be readily appreciated, the burner configurations of the '512 patent have certain features that may be implemented in embodiments of the present burners, such as, for example, a burner barrel, multiple gas spuds, and a burner plate with port slots for channeling combustion air and injected fuel into a combustion chamber. The present burner assemblies may achieve yet further reduction of $NO_X$ formation by using TEG as described in this disclosure.

Some embodiments of the present burner assemblies may be suited for use in a Steam Assisted Gravity Drainage (SAGD) processes for extracting oil from tar sand fields, but can also be utilized in other operations. Unlike related-butsimilar combined cycle power generation or other similar applications that have high power output requirements and low steam production requirements, the unique requirement of the SAGD type of system is the requirement for high steam production and lower power production. Due to this set of requirements, the fuel turbine for generating electricity may be small in comparison to the once-through steam generator (boiler), such that TEG generated by the turbine only provides a fraction (60-70%) of the oxygen required for the Max Combustion Rating (MCR) of the boiler. This allows the system to run with low excess air rates from 70-100% loads, with a combustion air fan providing the rest of the air. At lower than ~70% load, the total airflow remains constant, since the TEG flow is fixed.

Figure 2:
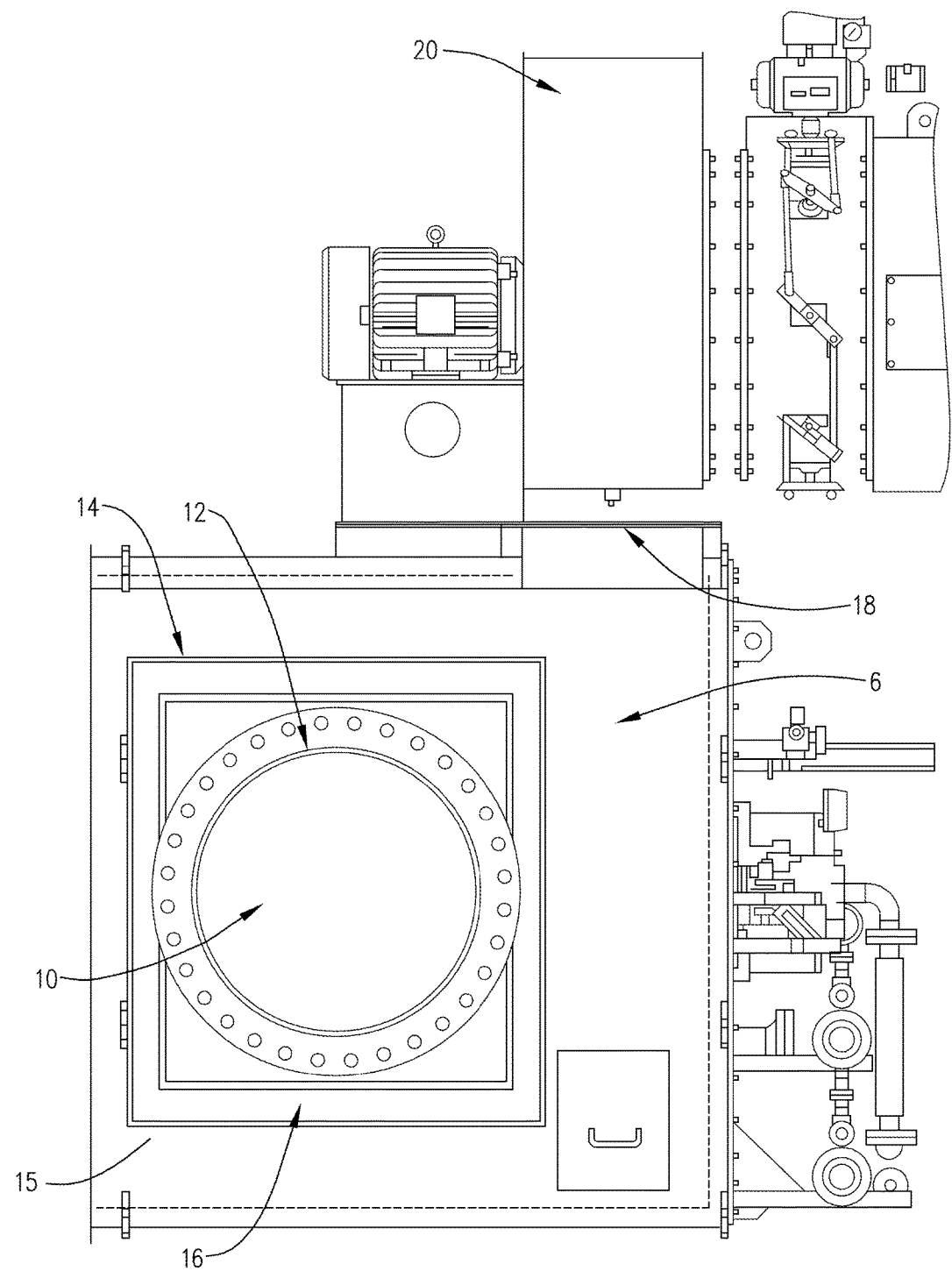

FIGS. 1-2 show a first embodiment 2 of one of the present low-NOx turbine exhaust fuel burner assemblies configured to operate in either of (i) a fresh air mode with an oxidizer of fresh air or (ii) a TEG mode with an oxidizer of a combination of TEG and fresh air. In the embodiment shown, assembly 2 comprises a windbox 6, a combustion air source 20 configured to supply fresh air to windbox 6 via a fresh air inlet 18, and a TEG duct 12 defining a TEG inlet 10 configured to receive TEG from a turbine exhaust duct. In the embodiment shown, combustion air source 20 comprises a fan. In other embodiments, combustion air source 20 can comprise any of various air movers (e.g., a fan, an air compressor, a fan and an air compressor, and/or the like). In addition to providing an oxidizer for combustion, fresh air flowing from combustion air source 20 can also play an important role in cooling internal components of the burner assembly and/or the windbox itself, such as, for example, due to convective cooling from combustion air, driven by the fan, flowing between the interior of the windbox 6 and components of the burner assembly that are disposed within the windbox 6 (e.g., TEG plenum 4). In some embodiments, such an air mover is driven and/or controlled by a variable frequency drive (VFD) configured to vary the output of the air mover, and/or combustion air source further comprises a control damper that is configured to vary the cross-sectional area available for flow out of the air mover (e.g., to vary the rate or speed of air flowing from the air mover).

In the embodiment shown, TEG duct 12 extends through windbox 6 via an opening 14. More particularly, in this configuration, TEG duct 12 is coupled to sidewall 15 of the windbox by an expansion joint 16. Expansion joint 16 is configured to both seal the interface between sidewall 15 and TEG duct 12, and provide a degree of mechanical isolation to allow for thermal expansion of (and resulting variations in relative positions of) TEG duct 12 and windbox 6.

Figure 3:
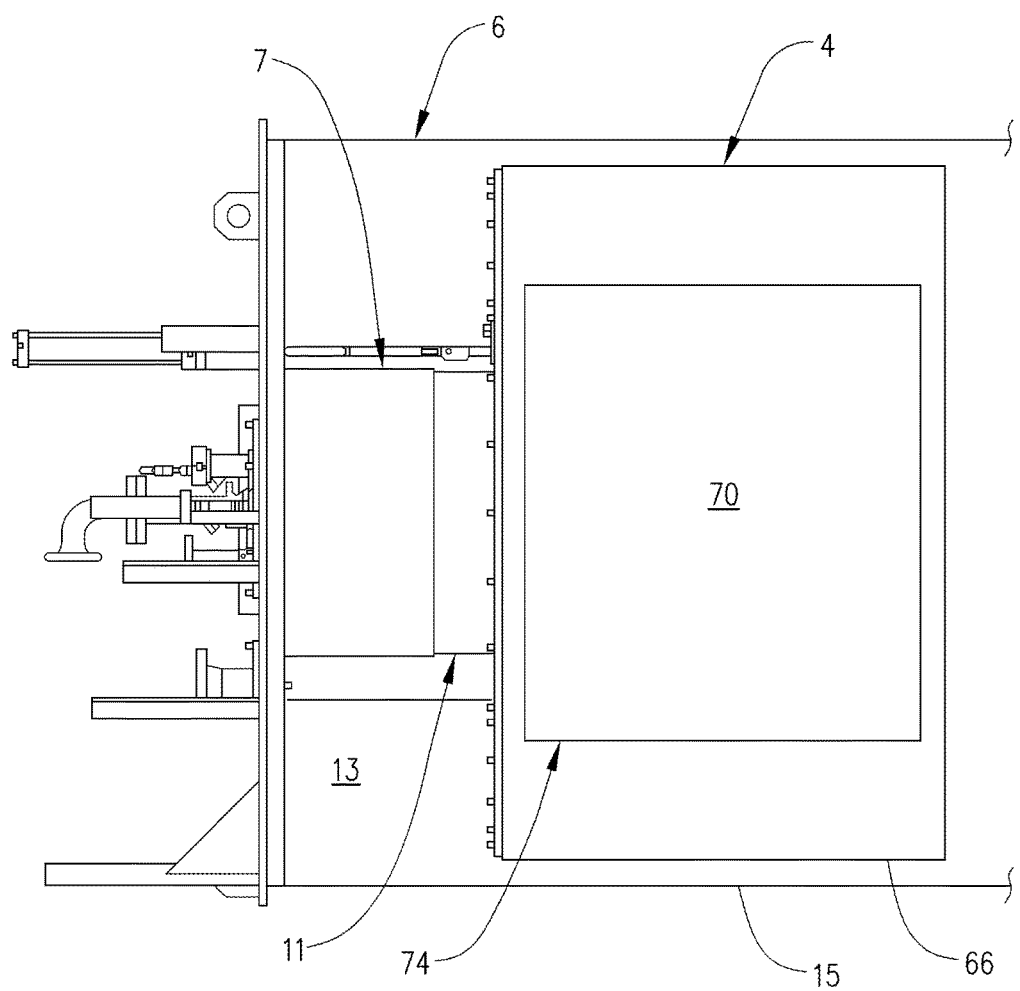
FIG. 3 shows partially cutaway right side view of the burner assembly of FIGS. 1 and 2.

FIG. 3 shows a side view of assembly 2 with a portion of sidewall 15 of windbox 6 cut away to reveal certain additional details of the assembly. As shown, in this embodiment, sidewall 15 of the windbox 6 defines a chamber 13. Those skilled in the art will understand that sidewall 15 also defines fresh air inlet 18 (shown in FIGS. 1 and 2) through the sidewall 15. Fresh air inlet 18 is in fluid communication with the chamber 13. As also shown, the depicted assembly further comprises a TEG plenum 4 coupled to windbox 6 at front wall 9 (see FIG. 9) of windbox 6, and in fluid communication with TEG inlet 10. In this way, TEG may be ducted from a gas turbine to TEG inlet 10, where it passes into TEG duct 12 via TEG inlet 10, and through TEG duct 12 (thus through a portion of combustion air windbox 6 forming windbox opening 14 per FIG. 1) into TEG plenum 4. As shown, TEG does not mix with the contents (fresh air) of the outer portions of combustion air windbox 6.

In the embodiment shown, TEG plenum 4 is disposed within the chamber 13 of windbox 6. More particularly, in this embodiment, TEG plenum 4 is coupled to a front wall 9 (FIG. 9) of windbox 6, and assembly 2 further comprises a slip connection 8 between windbox 6 and TEG plenum 4 to provide structural support of the TEG plenum and to allow for axial thermal expansion of the TEG plenum when hot TEG gases are present therein. For example, thermal expansion may be significant due to what may be significant temperature difference (e.g., nearly a 1000° F.) in the TEG plenum between the TEG mode and the fresh air mode. In the embodiment shown, TEG plenum 4 comprises a sidewall 66 defining a chamber 70 and an inlet 74 through the sidewall 66 of the TEG plenum 4 that is in fluid communication with the chamber 70. In some embodiments, TEG plenum 4 (e.g., sidewall 66) can comprise un-insulated stainless steel and/or any of various other materials (e.g., metals and/or alloys) that retain sufficient strength at high temperatures. In at least some embodiments, TEG plenum 4 need not be insulated because windbox 6 encompasses or surrounds the TEG plenum 4 and thereby protects users of the assembly from the hot uninsulated surfaces of the TEG plenum 4. In the embodiment shown, windbox 6 has a circular cylindrical shape; but may, in other embodiments, have any other shape (e.g., square or rectangular) that permits the functionality described in this disclosure. Similarly, TEG plenum 4 is shown with a circular cylindrical shape, but may have any other shape (e.g., square or rectangular) that permits the functionality described in this disclosure. Windbox 6 may comprise a variety of materials, such as, for example, standard carbon steel with several inches of insulation to protect users of the burner assembly.

Figure 4:
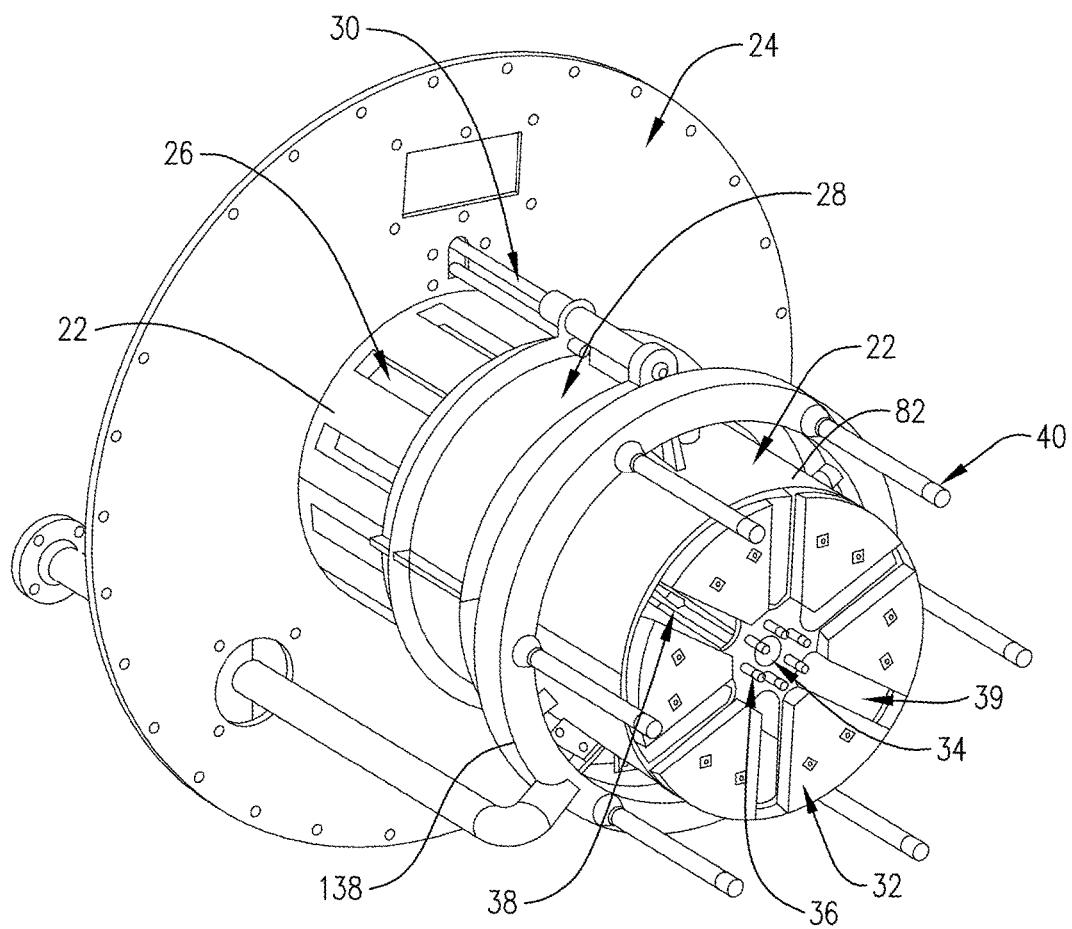
FIG. 4 shows a perspective view of a burner barrel and firing components of the burner assembly of FIGS. 1 and 2.
Figure 5:
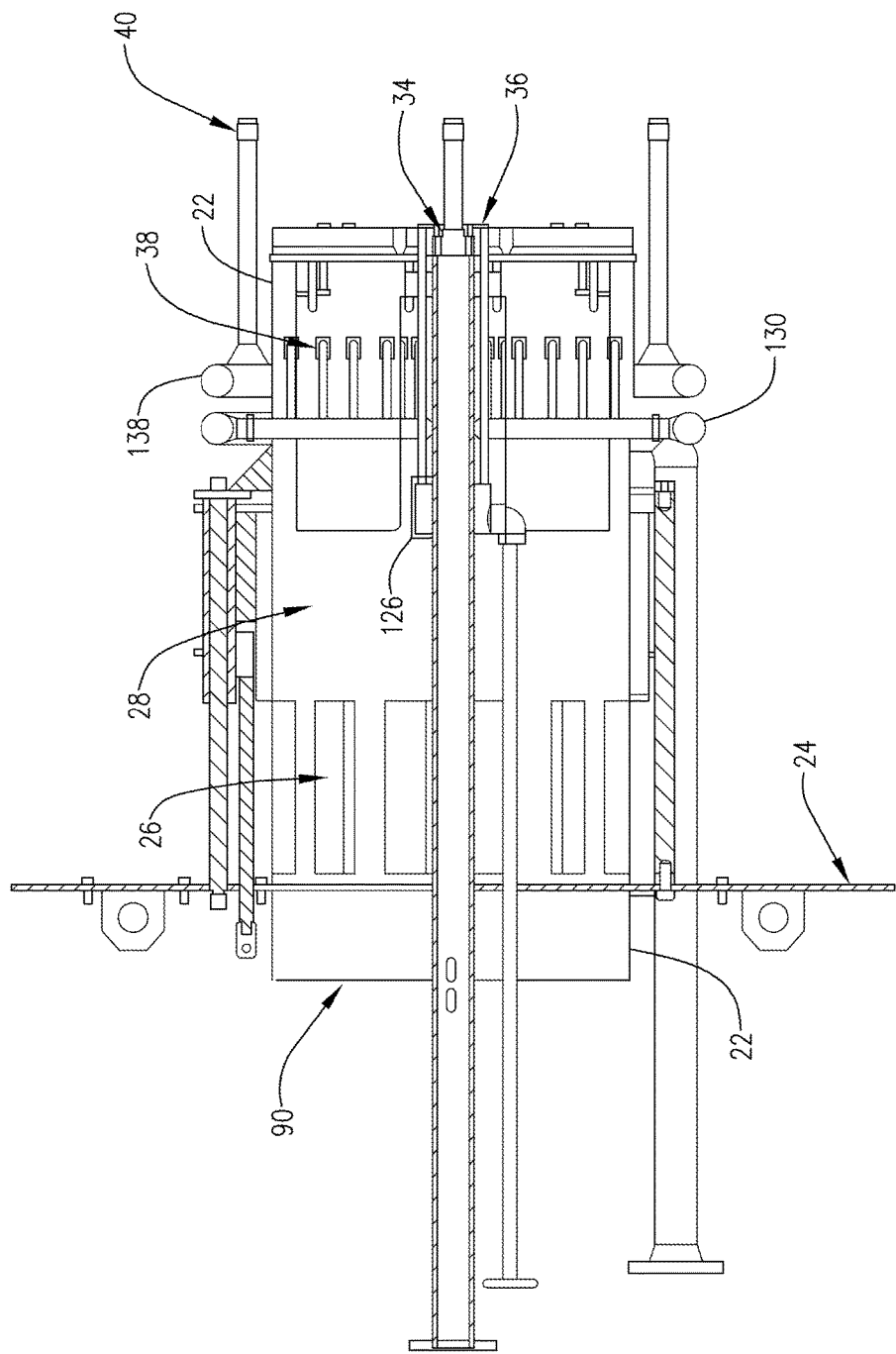
FIG. 5 shows a cross-sectional side view of the burner barrel and firing components of FIG. 4.
Figure 9:
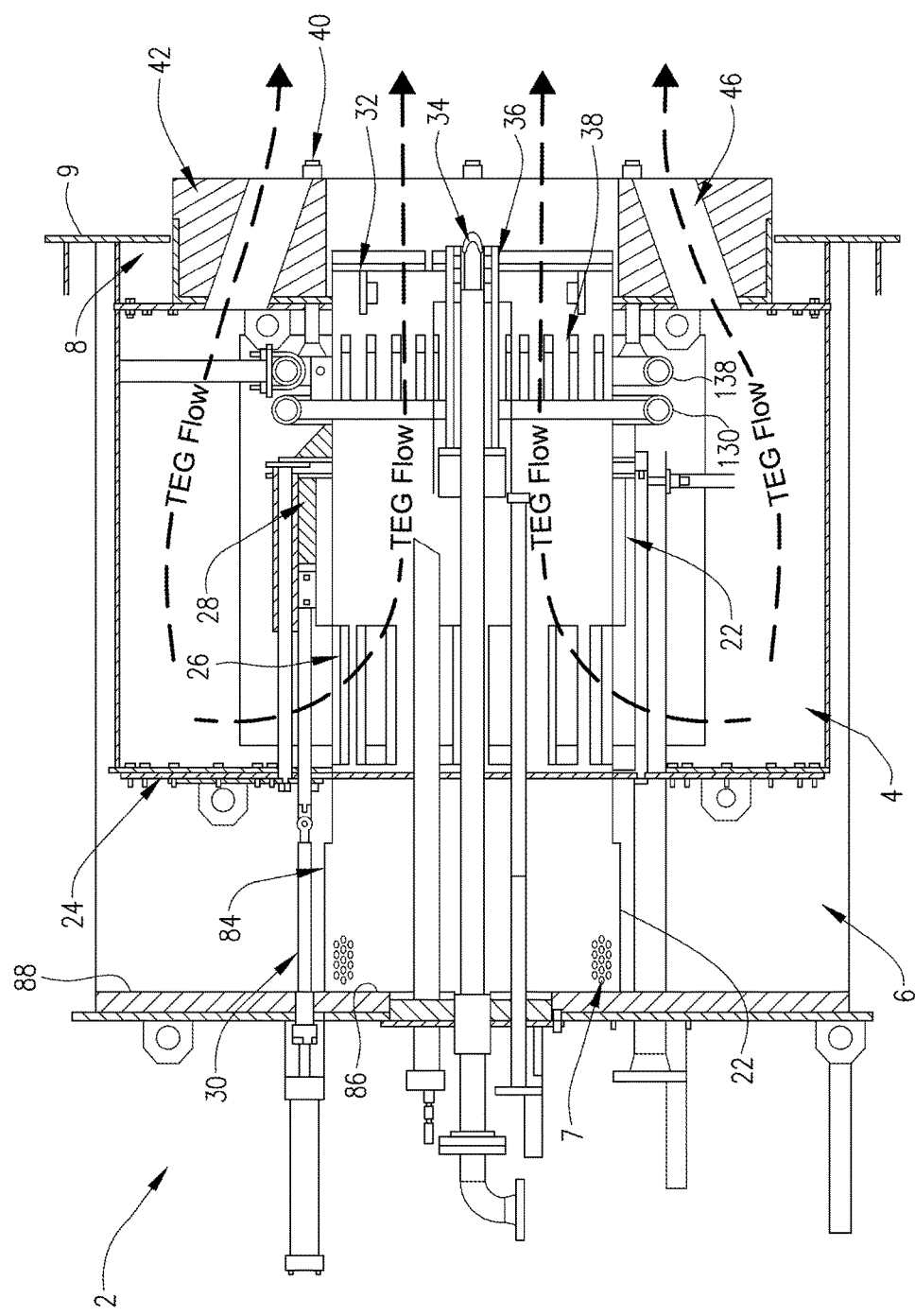
FIG. 9 shows a cross-sectional side view of the burner barrel and firing components of FIG. 4 in combination with the port ring of FIG. 6, showing the path of TEG flow in TEG mode.

FIGS. 4, 5 and 9 show cutaway perspective and cross-sectional side views, respectively, of a burner barrel 22 and firing components of assembly 2. In the embodiment shown, burner barrel 22 comprises a sidewall 82 defining a plurality of openings 26 and a channel 90 extending between a first end (left) and a second end (right). In the depicted configuration, burner barrel 22 is coupled to windbox 6 and TEG plenum 4. More particularly, burner barrel 22 is coupled to windbox 6 such that channel 90 is in fluid communication with the chamber 13 of the windbox 6 separately from or independent of openings 26; and the burner barrel 22 is coupled to TEG plenum 4 such that openings 26 can permit TEG to flow from chamber 70 of the TEG plenum into the channel 90 of the burner barrel 22. In this embodiment, burner barrel 22 is disposed at least partially within (e.g., in a coaxial relationship, as shown, with) TEG plenum 4, and at least partially within (e.g., in a coaxial relationship, as shown, with) windbox 6. In the embodiment shown, a windbox mounting flange 24 comprises a back wall of TEG plenum 4, and includes a hole in its center that is configured to, as shown, receive and support burner barrel 22 relative to the mounting flange 24 and TEG plenum 4.

In the embodiment shown, burner barrel 22 comprises an elongated tubular shape, at least a portion 84 of burner barrel 22 extends through flange 24 to be exposed to windbox 6. As illustrated, an end 86 of burner barrel 22 can be in contact with wall 88 of windbox 6. The portion 84 of burner barrel 22 can be a plurality of sets of small perforations 7 as illustrated in FIG. 9. As illustrated, openings 26 are shaped as elongated slots spaced circumferentially around the perimeter of the burner barrel 22. In this embodiment, slots 26 are elongated coaxially with the length of the burner barrel 22, and extend through sidewall 82 in communication with channel 90 to enable fluid communication between chamber 70 of TEG plenum 4 and channel 90 of the burner barrel 22. In the embodiment shown, assembly 2 further comprises one or more dampers 28 coupled to the burner barrel 22 and configured to be moved between at least: (i) a first configuration in which the damper(s) 28 cover openings 26 to substantially prevent TEG from entering the burner barrel 22 through the openings 26; and (ii) a second configuration in which the damper(s) 28 do not cover at least a portion of the openings 26 to permit TEG to enter the burner barrel 22 through the openings, or a portion thereof. More particularly, in the embodiment shown, the one or more dampers 28 comprise a slide damper 28 disposed around burner barrel 22 such that the slide damper 28 is slidable between the first configuration and the second configuration. More particularly, as shown, slide damper 28 comprises a cylindrical ring slidable coaxially along a portion of the length of the burner barrel 22 between the two configurations to completely cover slots 26 when closed and to completely expose or uncover slots 26 when opened. In the embodiment shown, damper 28 is configured to be moved by damper lever 30 that extends out of TEG plenum 4 through flange 24 such that the damper lever 30 can be coupled to an actuator (e.g., a linear actuator, servo, rack-and-pinion, and/or the like), such as, to enable automated actuation of the damper 28. When in the "open" position or configuration, damper 28 may have no operational impact and may cause no restriction of flow through slots 26.

In the embodiment shown, assembly 2 further comprises a burner plate 32 coupled to the end of burner barrel 22, a CFG gun fuel spud 34, a plurality of core fuel spuds 36, a plurality of inner fuel spuds 38, and a plurality of outer fuel spuds 40. In this embodiment, CFG gun fuel spud 34 extends from outside windbox 6, along and through the center of burner barrel 22, and out through a central hole in burner plate 32; six core fuel spuds 36 extend from a core fuel ring 126 through openings in burner plate 32; thirty-six inner fuel spuds 38 extend from an inner fuel ring 130 up to slot ports 39 in burner plate 32; and six outer fuel spuds 40 extend from an outer fuel ring 138 that encircles burner barrel 22. As shown, outer fuel spuds 40 extend beyond and about burner plate 32.

As best shown in FIG. 5, assembly 2 includes four fuel zones defined by the nozzle outlets of the fuel spuds, including a CFG gun zone, a core zone, and inner and outer zones, respectively corresponding to the outlets of CFG gun fuel spud 34, core fuel spuds 36, inner fuel spuds 38, and outer fuel spuds 40. This arrangement allows for dramatically different fuel splits based on firing condition (Fresh Air or TEG mode), providing optimal mixing and operation. Other configurations for the fuel spuds are possible, including variations in the length to which the fuel spuds extend into, about, or out of burner barrel 22, the spatial location of the fuel spuds with respect to each other and other components of the burner assembly, and/or the number and type of fuel spuds themselves.

FIGS. 6-8 show a refractory port ring 42 having an aperture 44 in its center and staged ports 46 that penetrate port ring 42. Staged ports 46 may function to inject TEG directly into a boiler via angled, round ports passing through a refractory front wall of the boiler. In some embodiments, staged ports 46 may be disposed circumferentially around the burner centerline, and contain an exit angle so TEG flow is injected inward toward a central, longitudinal axis of the port ring. In this embodiment, port ring 42 also has six fuel spud holes 48 so port ring 42 can be installed over outer fuel spuds 40 such that port ring 42 aligns with burner barrel 22 and surrounds burner plate 32 (as best seen from FIG. 9). As shown in FIG. 7, staged ports 46 and fuel spud holes 48 extend from front to back through ring 42, to cooperate with a combustion chamber wall 49. Staged ports 46 may be angled and, in this embodiment, are angled in a direction toward the centerline of the burner barrel 22 (see FIG. 9). Fuel spud holes 48 may longitudinally extend in a same direction as outer fuel spuds 40. As shown in FIG. 8, staged ports 46 may be arranged circumferentially around aperture 44. As best seen in FIG. 9, when TEG flows through TEG plenum 4, TEG can enter the burner barrel 22 through slots 26 in the burner barrel 22, and can also enter through staged ports 46 of port ring 42. In other embodiments, staged ports 46 can be modified to produce different results by adjusting the angle, penetration, pitch, and/or the like.

FIG. 9 shows the flow of TEG through assembly 2 in the TEG mode. As shown, TEG plenum 4, mounted to burner barrel 22 by windbox mounting flange 24, delivers TEG both through angled staged ports 46 through port ring 42, and through slots 26 around burner barrel 22 to mix with fresh air from the combustion air windbox 6. As mentioned above, staged ports 46 in port ring 42 can be modified to produce different results by adjusting the angle, penetration, and pitch. For slots 26, the aspect ratio, and penetration can also be modified to affect results. Configuring these features in accordance with the present disclosure may ensure that burner assembly 2 sufficiently mixes fuel and oxygen to produce only trace quantities of unburned combustion products while operating with low excess air for both Fresh Air and TEG modes of operation.

Slots 26 can be isolated with slide damper 28 by actuation of damper lever 30. When so isolated, large flows of fresh air are prevented from passing through staged ports 46 when operating in fresh air mode. When closed, slide damper 28 may permit a small amount of leakage for cooling of staged ports 46. In the embodiment shown, the volumetric flow when firing with TEG is roughly twice the flow compared to fresh air firing. Ports 46, slots 26, and slide damper 28, working in conjunction, allow the burner to run burner pressure drops that are very similar for both TEG and fresh air modes. With these very similar pressure drops, the burner can operate with very similar flame envelopes.

CFG gun fuel spud 34 extends through a central hole in burner plate 32. The configuration of the CFG gun fuel spud 34, core fuel spuds 36, inner fuel spuds 38, and outer fuel spuds 40, provide assembly 2 with the ability to operate with significantly different fuel zone splits based on firing condition (Fresh Air or TEG mode), and thereby optimize mixing and operation in both modes.

Functionally, assembly 2 can be operated in a fresh air mode, particularly for initial firing of the burner, as well as in a TEG mode that includes drawing TEG into burner barrel 22 and combustion chamber along with combustion air via both combustion air windbox 6 and TEG plenum 4. As previously described, the combustion air can be driven by a forced draft fan as a combustion air source 20. About 10-15% of maximum capacity combustion air is desirable from a forced draft fan to keep windbox 6 cool. In the fresh air mode, the fan forces fresh air into windbox 6 and the fresh air is then taken into burner barrel 22 through barrel air inlet 7. The fresh air is forced through burner barrel 22 past the fuel zones and fuel spud outlets for ignition when mixed with injected fuel.

Figure 10:
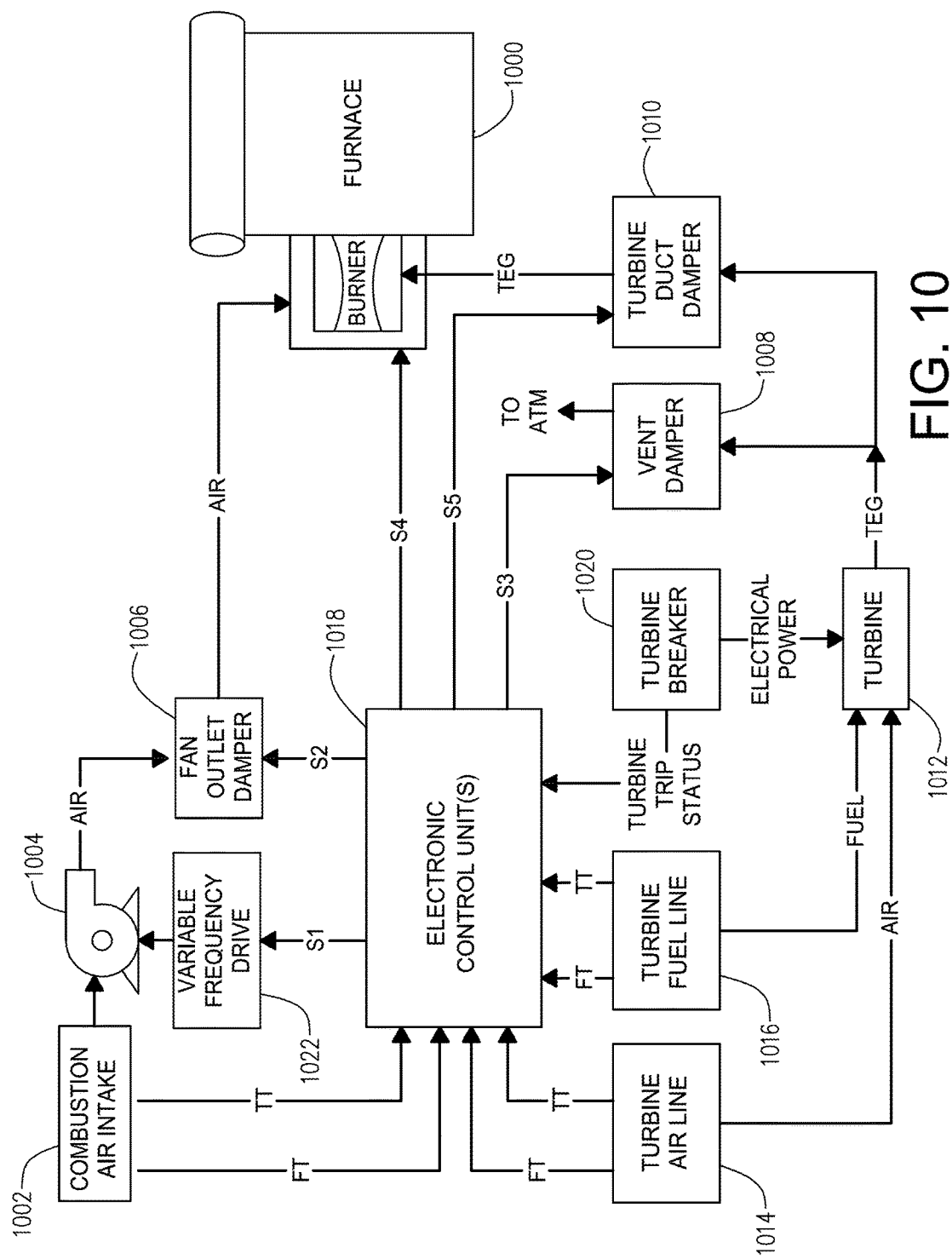
FIG. 10 shows a block diagram of an embodiment of the present burner assembly control systems.

FIG. 10 shows a block diagram of an embodiment of the present burner assembly control systems. In this embodiment, burner assembly 1000 may have many or all of the features described above, such as a TEG plenum receiving TEG from gas turbine 1012. The TEG plenum may be configured to introduce TEG, as governed by a damper, to a burner of burner assembly 1000 via openings in a burner barrel, and to introduce TEG to a boiler via one or more TEG ports. Turbine duct damper 1010 may regulate flow of TEG to the TEG plenum, and a damper may regulate flow from the TEG plenum to the burner barrel as described above. Vent damper 1008 allows the discharge of TEG to atmosphere when the turbine is running and the burner system is not operating in TEG mode. A fresh air source, such as a fan 1004, may receive air from combustion air intake 1002 and supply air to the fresh air windbox of burner assembly 1000. Fan 1004 may have variable frequency drive 1022 and fan control damper 1006 that may be operated, by one or more electronic control units 1018, to control the rate of airflow to the fresh air windbox.

One or more electronic control units 1018 may include computer processors and computer-readable media that receive flow data signals FT and temperature data signals TT from combustion air intake 1002. Electronic control units 1018 may also receive flow data signals FT and temperature data signals TT from turbine air line 1014 and turbine fuel line 1016 supplying gas turbine 1012. Electronic control units 1018 may further receive a turbine trip status signal from turbine breaker 1020 supplying electrical power to gas turbine 1012. As further detailed below, electronic control units 1018 may generate (e.g., based on the flow data signals FT, the temperature data signals TT, and the turbine trip status signal) various control signals S1 to S5 that respectively implement control of variable frequency drive 1022, fan control damper 1006, vent damper 1008, burner assembly 1000, and turbine duct damper 1010.

Figure 11:
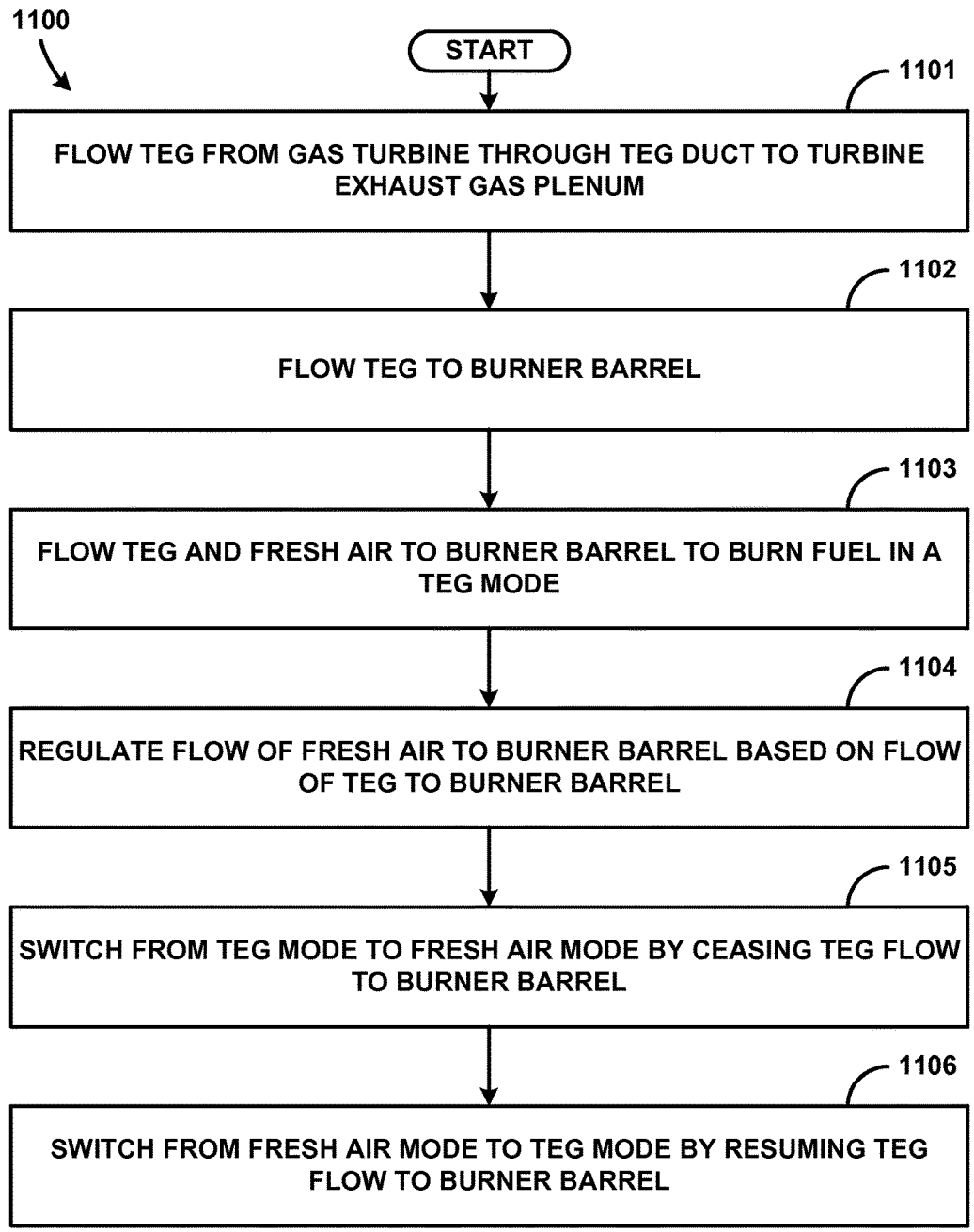
FIG. 11 shows a flowchart illustrating an embodiment of the present methods of operating a low $NO_X$ burner, such as one of the present low NOx burner assemblies.

FIG. 11 shows a flowchart illustrating an embodiment 1100 of the present methods for operating a low NOx burner assembly (e.g., 10). Method 1100 may begin at block 1101, which includes flowing TEG from a gas turbine through a TEG duct (e.g., 12) to a TEG plenum (e.g., 4). From the TEG plenum, at block 1102, TEG flows to burner barrel (e.g., 22), which is coupled to (and may be disposed within) the turbine exhaust plenum (e.g., 4).

Block 1103 involves the flow of TEG and fresh air to a burner barrel of the low $NO_X$ burner to burn fuel, in a TEG mode. The TEG flows from the gas turbine through a TEG inlet (e.g., 10), through a TEG duct (e.g., 12), and into the TEG plenum (e.g., 4). TEG then flows from the TEG plenum and proceeds to flow into the burner barrel (e.g., via slots 26), if a TEG damper (e.g., 28) is in an open position (i.e. not covering slots 26). In the burner barrel, the TEG mixes with fresh air, which enters the burner barrel (e.g., through air inlets 7). The mixture of TEG and fresh air in the burner barrel is then fed to one or more fuel zones via the burner barrel (e.g., at the end of the burner barrel). Concurrent with the feeding of the mixture of fresh air and TEG to the one or more fuel zones via the burner barrel, TEG is flowed from TEG plenum to the one or more fuel zones via staged ports (e.g., 46). The flow of TEG and the flow of the mixture of TEG and air to the one or more fuel zones collectively serve as the oxidizer in burning fuel in the one or more fuel zones, in a TEG mode.

At block 1104, the flow of fresh air to the burner barrel is regulated based on the flow of TEG to the burner barrel. In this way, just enough fresh air is supplied to the burner assembly to supplement the TEG as an oxidizer. In some aspects, the regulation of airflow may be implemented by measuring the temperature of the TEG, the differential flow of the TEG, and/or the oxygen concentration of the TEG to determine how much fresh air should be supplied to burner assembly 2. Alternatively, and as explained in greater detail below with reference to FIG. 12, in lieu of a differential pressure flowmeter used in the TEG exhaust, fuel flow and airflow to the fuel turbine may be measured and temperature compensated. Because the correct amount of fresh air supply is determined during operation of the low $NO_X$ burner, with corresponding changes to the flow of fresh air from the fresh air source, the low $NO_X$ burner can be operated with low exhaust excess air.

At least some of the present burners can be configured to seamlessly switch to and operate in a fresh air mode. Consistent with this, block 1105 involves switching from the TEG mode to a fresh air mode by, in part, ceasing TEG flow to the burner barrel. This may be implemented by moving the damper (e.g., 28) relative to (e.g., along the longitudinal axis of) the burner barrel to cover the slots (e.g., 26). The fresh air mode also involves continuing the flow and, typically, increasing the flow of fresh air to the burner barrel via air inlets (e.g., 7). The fresh air then flows to the burner zone where it is used to burn fuel in the fresh air mode.

Block 1106 involves switching back to the TEG mode from the fresh air mode. To resume the TEG mode, flow of TEG to the burner barrel is resumed by moving the damper relative to the burner barrel to uncover the slots (e.g., sliding damper 28 along the longitudinal axis of the burner barrel in the opposite direction as previously described) to reopen the slots. Resumption of the TEG mode involves continuing the flow and, typically, decreasing the flow of fresh air to the burner barrel via the air inlets. The mixture of fresh air and TEG then flows to the one or more fuel zones where it resumes burning fuel in the TEG mode.

Figure 12:
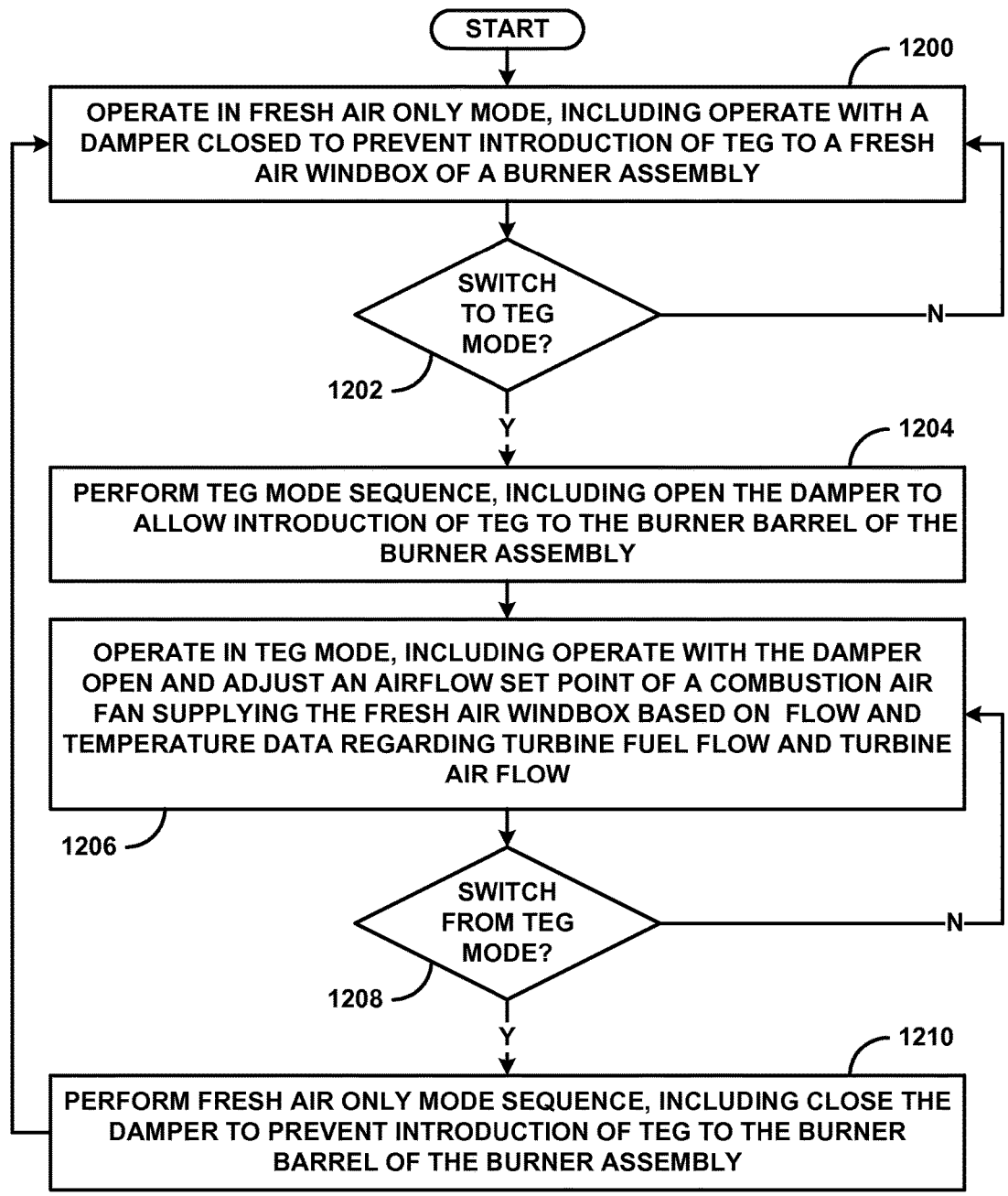
FIG. 12 shows a flowchart illustrating a second embodiment of the present methods operating a low-$NO_X$ burner assembly, such as one of the present low $NO_X$ burner assemblies.

FIG. 12 shows another flowchart illustrating another embodiment of the present methods of operating a burner assembly, such as, for example, as may implement an algorithm operable to switch the burner assembly to and/or from a fresh air only mode and a TEG mode of operation. Beginning at block 1200, the burner assembly may operate in a fresh air only mode. Operating the burner assembly at block 1200 may include operating with a damper closed to prevent, reduce, or restrict introduction of turbine exhaust gas (TEG) to a burner of the burner assembly. With a TEG source disabled, closing of the damper may also prevent too much fresh air from being misdirected from the burner barrel to the TEG plenum. Processing may proceed from block 1200 to block 1202.

At block 1202, the one or more computer processors may make a determination whether to switch from the fresh air only mode of operation to a TEG mode of operation. For example, the one or more computer processors may determine that an input has been received, from a human machine interface, to trigger a switch from the fresh air only mode to the TEG mode. If it is determined, at block 1202, not to switch to the TEG mode, then processing may return from block 1202 to block 1200. However, if it is determined, at block 1202, to switch to the TEG mode, then processing may continue to block 1204.

At block 1204, a sequence may be carried out to switch from fresh air only mode to TEG mode without requiring a shutdown. In operation, it is envisioned that a burner light off sequence may occur in either fresh air mode or in TEG mode. For example, fuel may be injected from one or more of the fuel spuds while combustion air may be forced through the burner barrel across a pilot light and a flame is ignited. When the burner is at lower firing rates (<40%), a Human Machine Interface (HMI) allows the operator to switch between Fresh Air mode and TEG mode or vice versa. Switching between these modes involves a sequence of operation. In some aspects, the sequence for switching from Fresh Air mode to TEG mode, at block 1204, may be carried out as follows:
1. TEG ducting line must be at or above a minimum temperature;
2. Operator initiates a change-over;
3. Burner modulates to Fresh-Air low fire;
4. TEG mode output from burner management system (BMS) is energized;
5. Fan control damper and VFD move to TEG light-off position;
6. Burner Slide Damper opens;
7. Fuel flow control valves (FCVs) move to a TEG light-off position; and
8. Turbine Duct Damper and vent damper move in concert to introduce TEG to the system by movement of the vent damper to a closed position and opening of the duct damper.

Processing may proceed from block 1204 to block 1206.

At block 1206, the one or more computer processors may operate the burner assembly in the TEG mode, including operating with the damper open, thereby allowing introduction of TEG to the burner of the burner assembly. It is also envisioned that operating the burner assembly in the TEG mode, at block 1206, may include adjusting an airflow set point of a combustion air source supplying a fresh air windbox of the burner assembly based on flow and temperature data. To this end, block 1206 may include metering both the oxygen from the combustion air fan and from the TEG to determine total airflow. It is desirable for TEG pressure drop to be minimized. In lieu of a differential pressure flowmeter used in the TEG exhaust, the fuel flow and airflow to the fuel turbine may be measured and temperature compensated. Thus, adjusting the airflow set point, at block 1206, may include determining a TEG equivalent airflow based on a measured volumetric flow of combustion air supplying a gas turbine that is a source of the TEG, and based on a measured volumetric flow of fuel supplying the gas turbine. Both of these volumetric flows may be corrected for ambient temperature and normalized to standard temperature and pressure. Adjusting the airflow set point, at block 1206, may also include subtracting the TEG equivalent airflow from a desired total airflow to determine the airflow set point of the combustion air source.

In certain aspects, the operations carried out at block 1206 may include using the measured flows to determine the equivalent mass flow of combustion air employing the following Equations [1]-[4].

Input Variables:
$Q_{GT,Air}$: The measured volumetric flow of the combustion air supplying the Gas Turbine, corrected for ambient temperature, and normalized to standard temperature and pressure.
$Q_{GT,Fuel}$: The measured volumetric flow of the natural gas fuel supplying the Gas Turbine, normalized to standard temperature and pressure.

Calculated Variables:
$Q_{GT,Total}$: The total volumetric flow of the Gas Turbine exhaust gas, normalized to standard temperature and pressure.
$\Phi$: The stoichiometry of the Gas Turbine combustion reaction. This is the ratio of air to fuel, corrected for the airflow required to burn a given amount of fuel. A $\Phi>1$ would have an excess of air to burn a set amount of fuel, a $\Phi<1$ would have insufficient air to burn a set amount of fuel, and a $\Phi=1$ would have exactly the amount of air required to burn a set amount of fuel.

% $O2_{TEG,vol,wet}$: The volumetric percentage of oxygen in the Turbine Exhaust Gas. "Wet" designates that water is included, rather than compared to "Dry" when water is not included in the calculation.
$Q_{Air\ Flow\ Equiv}$: The equivalent fresh airflow in the TEG, normalized for standard temperature and pressure. Required to compare and summarize the oxygen contribution of fresh air and TEG.

$$Q_{GT,Total} = Q_{GT,Air} + Q_{GT,Fuel} \quad [1]$$

$$\Phi = \frac{Q_{GT,Air} - 9.57 \times Q_{GT,Fuel}}{Q_{GT,Air}} + 1 \quad [2]$$

$$\%\ O2_{TEG,volwet} = 21.3649 \times (\Phi - 1) - 0.8459 \quad [3]$$

$$Q_{Air\ Flow\ Equiv} = \frac{\%\ O2_{TEG,volwet}}{20.7\%} \quad [4]$$

Since the TEG is a fixed uncontrollable flow, the operations carried out at block 1206 may subtract the flow of TEG equivalent airflow from a desired total airflow to determine the airflow set point of the combustion air fan. In aspects implementing a fan as a combustion air source, then a control loop may be implemented on a variable frequency drive (VFD) and damper control on the fan to adjust for variations in TEG flow and TEG $O_2$ and thereby maintain a desired (e.g., low) $O_2$. Processing may proceed from block 1206 to block 1208.

At block 1208, the one or more computer processors may make a determination whether to switch from the TEG mode of operation to the fresh air only mode of operation. For example, the one or more computer processors may determine that an input has been received, from a human machine interface, to trigger a switch from the TEG mode to the fresh air only mode. Alternatively or additionally, the one or more computer processors may detect a gas turbine trip while operating in the TEG mode, and determine to perform switching of the burner assembly from the TEG mode to the fresh air only mode in response to detecting the gas turbine trip. If it is determined, at block 1208, not to switch to the TEG mode, then processing may return from block 1208 to block 1206. However, if it is determined, at block 1208, to switch to the fresh air only mode, then processing may proceed to block 1210.

At block 1210, a sequence may be carried out to switch from the TEG mode to the fresh air only mode without requiring a shutdown of the burner assembly. An example sequence for switching back from TEG mode to fresh air mode, at block 1212, is as follows:
1. Operator initiates change-over;
2. Burner modulates to TEG low fire;
3. Turbine Duct Damper and vent damper move in concert to remove TEG from the system, by movement of the vent damper to an open position and closing of the duct damper;
4. TEG mode output from BMS is de-energized;
5. FCVs move to a Fresh-Air light-off position;
6. Burner Slide damper closes;
7. Fan control damper and VFD move to Fresh-air light-off position; and
8. System delays release to modulate for a predetermined time interval to allow the system to stabilize.

If any part of the sequence fails, the system may revert to the previous operating mode. This sequence involves adjusting airflow, dramatically changing the split of fuel flow, moving damper 28, as well as operating TEG ducting dampers (external to the burner assembly).

In summary, implementing the methods and systems of the present disclosure provide solutions that, alone or in combination, achieve one or more technological advantages. For example, because there is seamless switch between TEG mode and fresh air mode, low NOx burners can be operated so as to minimize a design unscheduled shutdowns. Because of this, low $NO_X$ burners may operate with fresh air only so that steam may be generated even when a gas turbine is not running in a combined cycle system. This advantage is significant because the loss of heat and steam in certain applications, for even a short period, may cause a significant impact on production, and thus can be extremely costly. Additionally, low $NO_X$ burners according to embodiments of the disclosure further reduce combustion exhaust levels of burners for environmental and health reasons as well as to meet governmental regulations for low $NO_X$ emissions of commercial burners, while operating combustion equipment with a minimal amount of excess air. Further yet, the configuration of the four fuel zones as described herein optimizes thermal efficiency of operation of industrial boilers.

The above description is illustrative and is not restrictive. Many variations of the disclosure will become apparent to those skilled in the art upon review of the disclosure. One or more features from any aspect described herein may be combined with one or more features of any other aspect without departing from the scope of the disclosure. The scope of the disclosure should, therefore, be not determined with reference solely to the above description, but instead should be determined with reference to the pending claims along with their full scope or equivalents in view of the above description.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

The invention claimed is:

1. A low-NOx turbine exhaust fuel burner assembly configured to operate with an oxidizer of either fresh air or a combination of turbine exhaust gas (TEG) and fresh air, the low-NOx turbine exhaust fuel burner assembly comprising:
   a windbox comprising a sidewall defining a windbox chamber and a fresh air inlet through the sidewall of the windbox, wherein the fresh air inlet is in fluid communication with the windbox chamber;
   a TEG plenum coupled to the windbox, the TEG plenum comprising a sidewall defining a plenum chamber and a TEG inlet through the sidewall of the TEG plenum, wherein the TEG inlet is in fluid communication with the plenum chamber of the TEG plenum;
   a burner barrel having a first end and a second end, the burner barrel extending through the windbox chamber and the plenum chamber of the TEG plenum, the burner barrel having a sidewall defining a first plurality of openings, a second plurality of openings, and a channel extending between the first end of the burner barrel and the second end of the burner barrel, the second plurality of openings configured to permit fresh air to flow from the windbox chamber into the channel of the burner barrel, the first plurality of openings configured to permit TEG to flow from the TEG plenum into the channel of the burner barrel, and wherein, at the second end of the burner barrel, the channel opens to a first fuel zone in a combustion chamber;
   one or more dampers coupled to the burner barrel and configured to be moved between at least:
      a first configuration in which the one or more dampers cover the first plurality of openings to substantially prevent TEG from entering the burner barrel through the first plurality of openings; and
      a second configuration in which the one or more dampers do not cover at least a respective portion of each opening of the first plurality of openings to permit TEG to enter the burner barrel through the first plurality of openings;
   a burner plate at the second end of the burner barrel;
   a center fire gas gun fuel spud configured to inject fuel for combustion into the first fuel zone, wherein the center fire gas gun fuel spud extends in a downstream direction and through the burner barrel from the first end of the burner barrel toward the second end of the burner barrel and through the burner plate into the first fuel zone; and
   a port ring having an annular body and coupled to the TEG plenum, wherein the port ring encircles the second end of the burner barrel and the burner plate, the annular body defining a plurality of ports configured to permit TEG to flow from the plenum chamber of the TEG plenum, through the plurality of ports, and into the combustion chamber.

2. The low-NOx turbine exhaust fuel burner assembly of claim 1, further comprising: an air mover adapted to flow fresh air through the fresh air inlet.

3. The low-NOx turbine exhaust fuel burner assembly of claim 2, where the air mover comprises a fan, a compressor, or a fan and a compressor.

4. The low-NOx turbine exhaust fuel burner assembly of claim 1, where the TEG plenum is disposed within the windbox such that the windbox chamber surrounds the TEG plenum.

5. The low-NOx turbine exhaust fuel burner assembly of claim 4, further comprising:
   a duct coupled to the TEG plenum in fluid communication with the TEG inlet and configured to introduce TEG from a turbine into the TEG plenum.

6. The low-NOx turbine exhaust fuel burner assembly of claim 5, wherein the combustion chamber is configured to provide heat in a boiler.

7. The low-NOx turbine exhaust fuel burner assembly of claim 1, where the one or more dampers comprise a slide damper disposed around the burner barrel such that the slide damper is slidable between the first configuration and the second configuration.

8. The low-NOx turbine exhaust fuel burner assembly of claim 1, wherein the TEG plenum is disposed within the windbox chamber and coupled to the windbox by a slip connection.

9. The low-NOx turbine exhaust fuel burner assembly of claim 1, further comprising:
a plurality of core fuel spuds extending in the downstream direction within the TEG plenum to and through the burner plate so as to surround the center fire gas gun fuel spud;
a plurality of inner fuel spuds extending in the downstream direction within the TEG plenum towards the burner plate, and wherein the burner plate has a plurality of slot ports and the plurality of inner fuel spuds are aligned with the plurality of slot ports, and wherein the plurality of inner fuel spuds are positioned radially outward from the plurality of core fuel spuds; and
a plurality of outer fuel spuds extending in the downstream direction within the TEG plenum to and through the port ring into the combustion chamber, wherein the plurality of outer fuel spuds are positioned radially outward from the plurality of inner fuel spuds.

10. The low-NOx turbine exhaust fuel burner assembly of claim 9, wherein:
the TEG plenum is disposed within the windbox such that the windbox chamber surrounds the TEG plenum, and the TEG plenum is coupled to the windbox by a slip connection;
the low-NOx turbine exhaust fuel burner assembly is configured to receive TEG from a turbine, and wherein the combustion chamber is configured to provide heat in a boiler; and
the one or more dampers comprise a slide damper disposed around the burner barrel such that the slide damper is slidable between the first configuration and the second configuration.

11. The low-NOx turbine exhaust fuel burner assembly of claim 10, wherein the plurality of ports are angled inward relative to a longitudinal axis of the burner barrel.

12. A low-NOx turbine exhaust fuel burner assembly comprising:
a windbox;
a turbine exhaust gas (TEG) plenum;
a burner barrel having a first end, a second end, a sidewall defining a first plurality of openings and a second plurality of openings, and a channel extending between the first end of the burner barrel and the second end of the burner barrel, the burner barrel coupled to the windbox and the TEG plenum such that:
the second plurality of openings is configured to permit fresh air to flow from the windbox into the channel of the burner barrel, and
the first plurality of openings is configured to permit TEG to flow from the TEG plenum into the channel of the burner barrel; and
a burner plate at the second end of the burner barrel;
a center fire gas gun fuel spud configured to inject fuel for combustion into a first fuel zone, wherein the center fire gas gun fuel spud extends in a downstream direction and through the burner barrel from the first end of the burner barrel toward the second end of the burner barrel and through the burner plate;
a port ring defining an annular body and coupled to the TEG plenum, wherein the port ring encircles the second end of the burner barrel and the burner plate, the annular body defining a plurality of ports configured to permit TEG to flow from the TEG plenum, through the plurality of ports, and into a combustion chamber located downstream from the burner plate and the port ring;
a plurality of core fuel spuds extending through the burner plate so as to surround the center fire gas gun fuel spud;
a plurality of inner fuel spuds extending towards the burner plate, and wherein the burner plate has a plurality of slot ports and the plurality of inner fuel spuds are aligned with the plurality of slot ports, and wherein the plurality of inner fuel spuds are positioned radially outward from the plurality of core fuel spuds; and
a plurality of outer fuel spuds extending to and through the port ring and into the combustion chamber, wherein the plurality of outer fuel spuds are positioned radially outward from the plurality of inner fuel spuds.

13. The low-NOx turbine exhaust fuel burner assembly of claim 12, further comprising:
one or more dampers coupled to the burner barrel and configured to be moved between at least:
a first configuration in which the one or more dampers cover the first plurality of openings to substantially prevent TEG from entering the burner barrel through the first plurality of openings; and
a second configuration in which the one or more dampers do not cover at least a respective portion of each opening of the first plurality of openings to permit TEG to enter the burner barrel through the first plurality of openings;
wherein the one or more dampers comprise a slide damper disposed around the burner barrel such that the slide damper is slidable between the first configuration and the second configuration.

14. A method of operating a low-NOx turbine exhaust fuel burner assembly, the low-NOx turbine exhaust fuel burner assembly comprising a windbox, wherein the windbox has a sidewall, the sidewall of the windbox defines a windbox chamber and a fresh air inlet through the sidewall of the windbox, and the fresh air inlet is in fluid communication with the windbox chamber, the low-NOx turbine exhaust fuel burner assembly further comprising a turbine exhaust gas (TEG) plenum coupled to the windbox, wherein the TEG plenum has a sidewall, the sidewall of the TEG plenum defines a plenum chamber and a TEG inlet through the sidewall of the TEG plenum, and the TEG inlet is in fluid communication with the plenum chamber of the TEG plenum, the low-NOx turbine exhaust fuel burner assembly further comprising a burner barrel having a first end and a second end, wherein the burner barrel extends through the windbox chamber and the plenum chamber of the TEG plenum, the burner barrel has a sidewall defining a first plurality of openings and a second plurality of openings, the sidewall of the burner barrel defines a channel extending between the first end of the burner barrel and the second end of the burner barrel, the second plurality of openings is configured to permit fresh air to flow from the windbox chamber into the channel of the burner barrel, the first plurality of openings is configured to permit TEG to flow from the TEG plenum into the channel of the burner barrel, and the channel of the burner barrel is open at the second end of the burner barrel to a first fuel zone in a combustion chamber, the low-NOx turbine exhaust fuel burner assembly further comprising one or more dampers coupled to the burner barrel and configured to be moved between at least a first configuration in which the one or more dampers cover the first plurality of openings to substantially prevent TEG from entering the burner barrel through the first plurality of openings and a second configuration in which the one or more dampers do not cover at least a respective portion of each opening of the first plurality of openings to permit TEG to enter the burner barrel through the first plurality of openings, the low-NOx turbine exhaust fuel burner assembly further comprising a burner plate at the second end of the burner barrel, a port ring, and a center fire gas gun fuel spud configured to inject fuel for combustion into the first fuel zone, wherein the center fire gas gun fuel spud extends in a downstream direction and through the burner barrel from the first end of the burner barrel toward the second end of the burner barrel and through the burner plate into the first fuel zone, the port ring has an annular body and is coupled to the TEG plenum, the port ring encircles the second end of the burner barrel and the burner plate, and the annular body of the port ring defines a plurality of ports configured to permit TEG to flow from the plenum chamber of the TEG plenum, through the plurality of ports, and into the combustion chamber, the method comprising:

operating the low-NOx turbine exhaust fuel burner assembly in a TEG mode in which TEG and fresh air flow to the burner barrel to burn fuel;

regulating the flow of fresh air based on one or more characteristics of the flowing TEG;

switching operation of the low-NOx turbine exhaust fuel burner assembly from the TEG mode to a fresh air mode in which fresh air, but not TEG, flows to the burner barrel to burn the fuel, wherein switching operation from the TEG mode to the fresh air mode is performed by moving the one or more dampers into the first configuration to stop the flow of TEG to the burner barrel while fresh air continues to flow to the burner barrel to burn the fuel; and switching operation of the low-NOx turbine exhaust fuel burner assembly from the fresh air mode to the TEG mode by moving the one or more dampers into the second configuration to resume the flow of TEG to the burner barrel, while continuing to provide the flow of fresh air to the burner barrel to burn the fuel.

15. The method of claim 14, wherein, while operating in the TEG mode, TEG flows through a duct to the TEG plenum, from the TEG plenum to the burner barrel, fresh air flows from an air mover into the burner barrel; and wherein the one or more characteristics of the flowing TEG are selected from the group consisting of: a concentration of oxygen in the TEG, an amount of TEG flowing to the burner barrel, a temperature of the flowing TEG, a rate of fuel flow to a turbine supplying the TEG, a temperature of the fuel flowing to the turbine, a rate of air flow to the turbine, and a temperature of the air flowing to the turbine.

16. The method of claim 14, further comprising:

regulating a flow rate of TEG to the TEG plenum during operation in the TEG mode by adjusting a position of the one or more dampers relative to the burner barrel.

17. The method of claim 14, wherein switching operation from the TEG mode to the fresh air mode is performed in response to a turbine supplying the TEG ceasing to operate.

18. The method of claim 15, wherein fresh air flowing through the windbox cools the TEG plenum, the TEG plenum being surrounded by the windbox.

19. A method of operating a low-NOx turbine exhaust fuel burner assembly, the low-NOx turbine exhaust fuel burner assembly comprising a windbox, wherein the windbox has a sidewall, the sidewall of the windbox defines a windbox chamber and a fresh air inlet through the sidewall of the windbox, and the fresh air inlet is in fluid communication with the windbox chamber, the low-NOx turbine exhaust fuel burner assembly further comprising a turbine exhaust gas (TEG) plenum coupled to the windbox, wherein the TEG plenum has a sidewall, the sidewall of the TEG plenum defines a plenum chamber and a TEG inlet through the sidewall of the TEG plenum, and the TEG inlet is in fluid communication with the plenum chamber of the TEG plenum, the low-NOx turbine exhaust fuel burner assembly further comprising a burner barrel having a first end and a second end, wherein the burner barrel extends through the windbox chamber and the plenum chamber of the TEG plenum, the burner barrel has a sidewall defining a first plurality of openings and a second plurality of openings, the sidewall of the burner barrel defines a channel extending between the first end of the burner barrel and the second end of the burner barrel, the second plurality of openings is configured to permit fresh air to flow from the windbox chamber into the channel of the burner barrel, the first plurality of openings is configured to permit TEG to flow from the TEG plenum into the channel of the burner barrel, and the channel of the burner barrel is open at the second end of the burner barrel to a first fuel zone in a combustion chamber, the low-NOx turbine exhaust fuel burner assembly further comprising one or more dampers coupled to the burner barrel and configured to be moved between at least a first configuration in which the one or more dampers cover the first plurality of openings to substantially prevent TEG from entering the burner barrel through the first plurality of openings and a second configuration in which the one or more dampers do not cover at least a respective portion of each opening of the first plurality of openings to permit TEG to enter the burner barrel through the first plurality of openings, the low-NOx turbine exhaust fuel burner assembly further comprising a burner plate at the second end of the burner barrel, a port ring, and a center fire gas gun fuel spud configured to inject fuel for combustion into the first fuel zone, wherein the center fire gas gun fuel spud extends in a downstream direction and through the burner barrel from the first end of the burner barrel toward the second end of the burner barrel and through the burner plate into the first fuel zone, the port ring has an annular body and is coupled to the TEG plenum, the port ring encircles the second end of the burner barrel and the burner plate, and the annular body of the port ring defines a plurality of ports configured to permit TEG to flow from the plenum chamber of the TEG plenum, through the plurality of ports, and into the combustion chamber, the method comprising:

operating the low-NOx turbine exhaust fuel burner assembly in a TEG mode in which TEG and fresh air flow to the burner barrel to burn fuel; and switching operation of the low-NOx turbine exhaust fuel burner assembly from the TEG mode to a fresh air mode in which fresh air, but not TEG, flows to the burner barrel to burn the fuel, wherein switching operation from the TEG mode to the fresh air mode is performed in response to detecting a gas turbine trip.

20. The method of claim 19, wherein switching operation from the TEG mode to the fresh air mode comprises increasing fresh air flow to the burner barrel.

21. The method of claim 19, wherein switching operation from the TEG mode to the fresh air mode is performed according to a sequence of operations to achieve a predetermined amount of thermal energy generation from the low-NOx turbine exhaust fuel burner assembly, the sequence of operations including:

reducing a rate of burning the fuel to a TEG low fire state;

moving fuel flow control valves to a fresh air light-off position;

moving the one or more dampers to the first configuration to prevent TEG from flowing into the burner barrel; and adjusting an air mover to supply fresh air to the burner barrel at a fresh air light-off rate.

22. A method of operating a low-NOx turbine exhaust fuel burner assembly, the low-NOx turbine exhaust fuel burner assembly comprising a windbox, a turbine exhaust gas (TEG) plenum, and a burner barrel having a first end and a second end, wherein the burner barrel has a sidewall defining a first plurality of openings and a second plurality of openings, the sidewall defines a channel extending between the first end of the burner barrel and the second end of the burner barrel, and the burner barrel is coupled to the windbox and the TEG plenum such that the second plurality of openings is configured to permit fresh air to flow from the windbox into the channel of the burner barrel and such that the first plurality of openings is configured to permit TEG to flow from the TEG plenum into the channel of the burner barrel, the low-NOx turbine exhaust fuel burner assembly further comprising a burner plate at the second end of the burner barrel, a center fire gas gun fuel spud configured to inject fuel for combustion into a first fuel zone, and a port ring, wherein the center fire gas gun fuel spud extends in a downstream direction and through the burner barrel from the first end of the burner barrel toward the second end of the burner barrel and through the burner plate, the port ring defines an annular body and is coupled to the TEG plenum, the port ring encircles the second end of the burner barrel and the burner plate, the annular body defines a plurality of ports configured to permit TEG to flow from the TEG plenum and through the plurality of ports and into a combustion chamber located downstream from the burner plate and the port ring, the low-NOx turbine exhaust fuel burner assembly further comprising a plurality of core fuel spuds extending through the burner plate so as to surround the center fire gas gun fuel spud, a plurality of inner fuel spuds extending towards the burner plate, and a plurality of outer fuel spuds extending to and through the port ring and into the combustion chamber, wherein the burner plate has a plurality of slot ports and the plurality of inner fuel spuds are aligned with the plurality of slot ports, the plurality of inner fuel spuds are positioned radially outward from the plurality of core fuel spuds, and the plurality of outer fuel spuds are positioned radially outward from the plurality of inner fuel spuds, the method comprising:

adjusting a combustion air source supplying fresh air to the low-NOx turbine exhaust fuel burner assembly based on one or more characteristics of a source of TEG for the low-NOx turbine exhaust fuel burner assembly.

23. The method of claim 22, wherein the source of TEG is a turbine, and wherein the one or more characteristics comprise respective flow parameters and respective temperatures of fuel and air flowing to the turbine.

24. The method of claim 22, wherein the source of TEG is a turbine, and wherein adjusting the combustion air source includes:

determining a TEG equivalent airflow based on:
 a measured volumetric flow of combustion air supplying the turbine, the measured volumetric flow of combustion air being corrected for ambient temperature and normalized to standard temperature and pressure; and
 a measured volumetric flow of fuel supplying the turbine, the measured volumetric flow of fuel being normalized to standard temperature and pressure; and subtracting the TEG equivalent airflow from a desired total airflow to determine an airflow set point of the combustion air source.

25. The method of claim 22, wherein the combustion air source comprises a fan, and wherein adjusting the combustion air source includes controlling a variable frequency drive and a control damper of the fan to adjust for variations in TEG flow and TEG $O_2$ to maintain a low stack exhaust $O_2$ setpoint.

* * * * *